US010046682B2

(12) United States Patent
Llne et al.

(10) Patent No.: US 10,046,682 B2
(45) Date of Patent: Aug. 14, 2018

(54) BACK CUSHION MODULE FOR A VEHICLE SEATING ASSEMBLY

(71) Applicant: Ford Global Technologies, LLC, Dearborn, MI (US)

(72) Inventors: Johnathan Andrew Llne, Northville, MI (US); Marc Silva Kondrad, Macomb, MI (US); Brett E. Ronzi, Highland, MI (US); Christian J. Hosbach, Taylor, MI (US); David Frederick Lyons, New Haven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 14/816,361

(22) Filed: Aug. 3, 2015

(65) Prior Publication Data
US 2017/0036579 A1    Feb. 9, 2017

(51) Int. Cl.
   *B60N 2/68*    (2006.01)
   *B60N 2/22*    (2006.01)
   (Continued)

(52) U.S. Cl.
   CPC .............. *B60N 2/686* (2013.01); *B60N 2/22* (2013.01); *B60N 2/64* (2013.01); *B60N 2/80* (2018.02)

(58) Field of Classification Search
   CPC .......... B60N 2/686; B60N 2/80; B60N 2/809; B60N 2/879; B60N 2/803; B60N 2/806;
   (Continued)

(56) References Cited

U.S. PATENT DOCUMENTS

| 616,178 A | 12/1898 | Barron |
|---|---|---|
| 771,773 A | 10/1904 | Feely |

(Continued)

FOREIGN PATENT DOCUMENTS

| CN | 201650491 U | 11/2010 |
|---|---|---|
| CN | 203097995 U | 7/2013 |

(Continued)

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

(Continued)

*Primary Examiner* — David R Dunn
*Assistant Examiner* — Tania Abraham
(74) *Attorney, Agent, or Firm* — Vichit Chea; Price Heneveld LLP

(57) ABSTRACT

A vehicle seating assembly includes a seating frame defined by a seatback frame and a seat frame. A plurality of distinct assembly modules are configured for attachment with the seating frame. The plurality of distinct assembly modules include a back cushion module, a hard back module, a seat cushion module, and a headrest module. The back cushion module and hard back module are operably coupled together. The headrest module extends over and operably couples the back cushion module with the seat cushion module to substantially encompass the seating frame. The seat cushion module is positioned on the seat frame in front of the seatback frame. First and second side trim pieces are configured to extend over the seat frame concealing side portions of the seat cushion module.

20 Claims, 15 Drawing Sheets

US 10,046,682 B2

Page 2

(51) Int. Cl.
*B60N 2/64* (2006.01)
*B60N 2/48* (2006.01)
*B60N 2/80* (2018.01)

(58) Field of Classification Search
CPC .. B60N 2/4808; B60N 2/4802; B60N 2/4805;
B60N 2/4876; B60N 2002/899; B60N
2002/4888
See application file for complete search history.

(56) References Cited

U.S. PATENT DOCUMENTS

| | | |
|---|---|---|
| 1,125,155 A | 1/1915 | Nunn |
| 2,272,505 A | 2/1942 | Biggs |
| 2,661,050 A | 12/1953 | Felter |
| 2,725,921 A | 12/1955 | Markin |
| 2,834,606 A | 5/1958 | Bertrand |
| 2,938,570 A | 5/1960 | Flajole |
| 2,958,369 A | 11/1960 | Pitts et al. |
| 3,007,738 A | 11/1961 | Gardel et al. |
| 3,018,133 A | 1/1962 | Mills |
| 3,273,877 A | 9/1966 | Geller et al. |
| 3,330,598 A | 7/1967 | Whiteside |
| 3,403,938 A | 10/1968 | Cramer et al. |
| 3,481,327 A | 12/1969 | Drennen |
| 3,512,605 A | 5/1970 | McCorkle |
| 3,520,327 A | 7/1970 | Claydon et al. |
| 3,550,953 A | 12/1970 | Neale |
| 3,592,508 A | 7/1971 | Druseikis |
| 3,612,607 A | 10/1971 | Lohr |
| 3,632,166 A | 1/1972 | Lohr |
| 3,663,057 A | 5/1972 | Lohr et al. |
| 3,669,492 A | 6/1972 | Peterson |
| 3,695,696 A * | 10/1972 | Lohr ............... B60N 2/686 24/647 |
| 3,779,577 A | 12/1973 | Wilfert |
| 3,792,897 A | 2/1974 | Alson |
| 3,795,021 A | 3/1974 | Moniot |
| 3,813,151 A | 5/1974 | Cadiou |
| 3,833,257 A | 9/1974 | Dove |
| 3,877,749 A | 4/1975 | Sakurai et al. |
| 3,880,462 A | 4/1975 | Mednick |
| 3,883,173 A | 5/1975 | Shephard et al. |
| 3,885,831 A | 5/1975 | Rasmussen |
| 3,915,421 A | 10/1975 | Le Forestier |
| 3,929,374 A | 12/1975 | Hogan et al. |
| 4,017,118 A | 4/1977 | Cawley |
| 4,018,477 A | 4/1977 | Hogan |
| 4,058,342 A | 11/1977 | Ettridge |
| 4,115,170 A | 9/1978 | Sanson |
| 4,190,286 A | 2/1980 | Bentley |
| 4,205,877 A | 6/1980 | Ettridge |
| 4,225,989 A | 10/1980 | Corbett et al. |
| 4,306,322 A | 12/1981 | Young et al. |
| 4,324,431 A | 4/1982 | Murphy et al. |
| 4,334,709 A | 6/1982 | Akiyama et al. |
| 4,353,595 A | 10/1982 | Kaneko et al. |
| 4,366,985 A | 1/1983 | Leffler |
| 4,415,203 A | 11/1983 | Cawley |
| 4,440,443 A | 4/1984 | Nordskog |
| 4,444,430 A | 4/1984 | Yoshida et al. |
| 4,452,485 A | 6/1984 | Schuster |
| 4,467,484 A | 8/1984 | Nagatake et al. |
| 4,491,364 A | 1/1985 | Hattori et al. |
| 4,491,365 A | 1/1985 | Murakami |
| 4,518,201 A | 5/1985 | Wahlmann et al. |
| 4,522,445 A | 6/1985 | Göldner et al. |
| 4,541,669 A | 9/1985 | Goldner |
| 4,580,837 A | 4/1986 | Bayley |
| 4,583,255 A | 4/1986 | Mogaki et al. |
| 4,583,781 A | 4/1986 | Hatsutta et al. |
| 4,589,695 A | 5/1986 | Isono |
| 4,592,588 A | 6/1986 | Isono et al. |
| 4,609,221 A | 9/1986 | Böttcher |
| 4,616,676 A | 10/1986 | Adams et al. |
| 4,616,874 A | 10/1986 | Pietsch et al. |
| 4,629,248 A | 12/1986 | Mawbey |
| 4,629,253 A | 12/1986 | Williams |
| 4,634,179 A | 1/1987 | Hashimoto et al. |
| 4,655,505 A | 4/1987 | Kashiwamura et al. |
| 4,664,444 A | 5/1987 | Murphy |
| 4,668,014 A | 5/1987 | Boisset |
| 4,693,513 A | 9/1987 | Heath |
| 4,707,027 A | 11/1987 | Horvath et al. |
| 4,711,497 A | 12/1987 | Kazaoka et al. |
| 4,718,723 A | 1/1988 | Bottemiller |
| 4,720,141 A | 1/1988 | Sakamoto et al. |
| 4,720,146 A | 1/1988 | Mawbey et al. |
| 4,726,086 A | 2/1988 | McEvoy |
| 4,752,982 A | 6/1988 | Jones et al. |
| 4,753,479 A | 6/1988 | Hatsutta et al. |
| 4,767,155 A | 8/1988 | Kousaka et al. |
| 4,773,703 A | 9/1988 | Krügener et al. |
| 4,775,185 A | 10/1988 | Scholin et al. |
| 4,781,413 A | 11/1988 | Shumack, Jr. |
| 4,790,592 A | 12/1988 | Busso et al. |
| 4,792,186 A | 12/1988 | Benjamin et al. |
| 4,796,313 A | 1/1989 | DiMatteo et al. |
| 4,822,092 A | 4/1989 | Sweers |
| 4,833,614 A | 5/1989 | Saitoh et al. |
| 4,840,429 A | 6/1989 | Stöckl |
| 4,856,844 A | 8/1989 | Isono |
| 4,858,992 A | 8/1989 | LaSota |
| 4,861,104 A | 8/1989 | Malak |
| 4,865,383 A | 9/1989 | Sbaragli et al. |
| 4,878,529 A | 11/1989 | Hormann |
| 4,884,843 A | 12/1989 | DeRees |
| 4,893,367 A | 1/1990 | Heimreid et al. |
| 4,915,447 A | 4/1990 | Shovar |
| 4,938,529 A | 7/1990 | Fourrey |
| 4,965,899 A | 10/1990 | Sekido et al. |
| 4,966,410 A | 10/1990 | Bishai |
| 4,971,380 A | 11/1990 | Cote et al. |
| 5,013,089 A | 5/1991 | Abu-Isa et al. |
| 5,018,790 A | 5/1991 | Jay |
| 5,020,852 A | 6/1991 | Marion |
| 5,050,930 A | 9/1991 | Schuster et al. |
| 5,054,845 A | 10/1991 | Vogel |
| 5,054,856 A | 10/1991 | Wang |
| 5,067,772 A | 11/1991 | Koa |
| 5,082,326 A | 1/1992 | Sekido et al. |
| 5,096,529 A | 3/1992 | Baker |
| 5,104,189 A | 4/1992 | Hanai et al. |
| 5,108,150 A | 4/1992 | Stas et al. |
| 5,112,018 A | 5/1992 | Wahls |
| 5,120,109 A | 6/1992 | Rangoni |
| 5,127,708 A | 7/1992 | Kishi et al. |
| 5,129,704 A | 7/1992 | Kishi et al. |
| 5,145,232 A | 9/1992 | Dal Monte |
| 5,171,062 A | 12/1992 | Courtois |
| 5,174,526 A | 12/1992 | Kanigowski |
| 5,186,494 A | 2/1993 | Shimose |
| 5,190,348 A | 3/1993 | Colasanti |
| 5,203,608 A | 4/1993 | Tame |
| 5,222,784 A | 6/1993 | Hamelin |
| 5,243,722 A | 9/1993 | Gusakov |
| 5,263,765 A | 11/1993 | Nagashima et al. |
| 5,280,997 A | 1/1994 | Andres et al. |
| 5,285,754 A | 2/1994 | Bell |
| 5,318,344 A | 6/1994 | Wang |
| 5,320,409 A | 6/1994 | Katoh et al. |
| 5,323,740 A | 6/1994 | Daily et al. |
| 5,364,164 A | 11/1994 | Kuranami |
| 5,370,443 A | 12/1994 | Maruyama |
| 5,375,569 A | 12/1994 | Santella |
| 5,380,063 A | 1/1995 | Dauphin |
| 5,443,303 A | 8/1995 | Bauer et al. |
| 5,458,365 A | 10/1995 | Rogers et al. |
| 5,518,292 A | 5/1996 | Cozzani |
| 5,518,294 A | 5/1996 | Ligon, Sr. et al. |
| 5,544,942 A | 8/1996 | Vu Khac et al. |
| 5,547,214 A | 8/1996 | Zimmerman, II et al. |
| 5,560,681 A | 10/1996 | Dixon et al. |
| 5,570,716 A | 11/1996 | Kamen et al. |

(56) References Cited

U.S. PATENT DOCUMENTS

| | | | |
|---|---|---|---|
| 5,588,708 A | 12/1996 | Rykken et al. |
| 5,597,203 A | 1/1997 | Hubbard |
| 5,609,394 A | 3/1997 | Ligon, Sr. et al. |
| 5,647,635 A | 7/1997 | Aumond et al. |
| 5,658,050 A | 8/1997 | Lorbiecki |
| 5,662,384 A | 9/1997 | O'Neill et al. |
| 5,667,427 A | 9/1997 | Airhart et al. |
| 5,678,891 A | 10/1997 | O'Neill et al. |
| 5,681,084 A | 10/1997 | Yoneda |
| 5,690,387 A | 11/1997 | Sarti |
| 5,692,802 A | 12/1997 | Aufrere et al. |
| 5,707,109 A | 1/1998 | Massara et al. |
| 5,738,368 A | 4/1998 | Hammond et al. |
| 5,755,493 A | 5/1998 | Kodaverdian |
| 5,758,924 A | 6/1998 | Vishey |
| 5,769,489 A | 6/1998 | Dellanno |
| 5,772,280 A | 6/1998 | Massara |
| 5,775,778 A | 7/1998 | Riley et al. |
| 5,785,669 A | 7/1998 | Proctor et al. |
| 5,799,971 A | 9/1998 | Asada |
| 5,803,490 A | 9/1998 | Seventko et al. |
| 5,815,393 A | 9/1998 | Chae |
| 5,823,620 A | 10/1998 | Le Caz |
| 5,826,312 A | 10/1998 | Schroder et al. |
| 5,826,938 A | 10/1998 | Yanase et al. |
| 5,836,648 A | 11/1998 | Karschin et al. |
| 5,860,699 A | 1/1999 | Weeks |
| 5,863,092 A | 1/1999 | Kifer |
| 5,868,450 A | 2/1999 | Hashimoto |
| 5,882,073 A | 3/1999 | Burchi et al. |
| 5,893,609 A | 4/1999 | Schmidt |
| 5,895,070 A | 4/1999 | Crimmins et al. |
| 5,902,014 A | 5/1999 | Dinkel et al. |
| 5,906,586 A | 5/1999 | Graham |
| 5,913,568 A | 6/1999 | Brightbill et al. |
| 5,918,696 A | 7/1999 | Vanvoorhies |
| 5,944,341 A | 8/1999 | Kimura et al. |
| 5,951,039 A | 9/1999 | Severinski et al. |
| 5,967,608 A | 10/1999 | Van Sickle |
| 5,975,629 A | 11/1999 | Lorbiecki |
| 5,975,637 A | 11/1999 | Geuss et al. |
| 5,979,985 A | 11/1999 | Bauer et al. |
| 5,983,940 A | 11/1999 | Smith |
| 5,988,674 A | 11/1999 | Kimura et al. |
| 6,019,387 A | 2/2000 | Jost |
| 6,024,378 A | 2/2000 | Fu |
| 6,024,406 A | 2/2000 | Charras et al. |
| 6,030,040 A | 2/2000 | Schmid et al. |
| 6,045,151 A | 4/2000 | Wu |
| 6,050,635 A | 4/2000 | Pajon et al. |
| 6,056,366 A | 5/2000 | Haynes et al. |
| 6,062,642 A | 5/2000 | Sinnhuber et al. |
| 6,068,339 A | 5/2000 | Linzalone |
| 6,079,767 A | 6/2000 | Faubert et al. |
| 6,079,781 A | 6/2000 | Tilley |
| 6,088,642 A | 7/2000 | Finkelstein et al. |
| 6,106,071 A | 8/2000 | Aebischer et al. |
| 6,106,163 A | 8/2000 | Inana et al. |
| 6,109,690 A | 8/2000 | Wu et al. |
| 6,145,925 A | 11/2000 | Eksin et al. |
| 6,155,593 A | 12/2000 | Kimura et al. |
| 6,158,812 A | 12/2000 | Bonke |
| 6,161,231 A | 12/2000 | Kraft et al. |
| 6,179,379 B1 | 1/2001 | Andersson |
| 6,189,966 B1 | 2/2001 | Faust et al. |
| 6,196,627 B1 | 3/2001 | Faust et al. |
| 6,199,252 B1 * | 3/2001 | Masters ............ B60N 2/0224 29/469 |
| 6,199,900 B1 | 3/2001 | Zeigler |
| 6,199,951 B1 | 3/2001 | Zeile et al. |
| 6,203,105 B1 | 3/2001 | Rhodes, Jr. |
| 6,206,466 B1 | 3/2001 | Komatsu |
| 6,209,915 B1 | 4/2001 | Blakesly |
| 6,217,062 B1 | 4/2001 | Breyvogel et al. |
| 6,217,118 B1 | 4/2001 | Heilig |
| 6,220,661 B1 | 4/2001 | Peterson |
| 6,224,150 B1 | 5/2001 | Eksin et al. |
| 6,231,068 B1 | 5/2001 | White, Jr. et al. |
| 6,231,076 B1 | 5/2001 | Blakesley et al. |
| 6,234,518 B1 | 5/2001 | Ryl et al. |
| 6,273,810 B1 | 8/2001 | Rhodes, Jr. et al. |
| 6,296,308 B1 | 10/2001 | Cosentino et al. |
| 6,302,431 B1 | 10/2001 | Sasaki et al. |
| 6,312,050 B1 | 11/2001 | Eklind |
| 6,341,797 B1 | 1/2002 | Seo |
| 6,349,993 B1 | 2/2002 | Walsh |
| 6,352,304 B1 | 3/2002 | Sorgenfrei |
| 6,352,310 B1 | 3/2002 | Schmidt et al. |
| 6,357,066 B1 | 3/2002 | Pierce |
| 6,357,789 B1 | 3/2002 | Harada et al. |
| 6,357,827 B1 | 3/2002 | Brightbill et al. |
| 6,364,414 B1 | 4/2002 | Specht |
| 6,375,269 B1 | 4/2002 | Maeda et al. |
| 6,382,720 B1 | 5/2002 | Franklin et al. |
| 6,386,577 B1 | 5/2002 | Kan et al. |
| 6,390,557 B1 | 5/2002 | Asano |
| 6,394,525 B1 | 5/2002 | Seibold |
| 6,394,546 B1 | 5/2002 | Knoblock et al. |
| 6,398,299 B1 | 6/2002 | Angerer et al. |
| 6,398,306 B1 | 6/2002 | MacK |
| 6,419,317 B1 | 7/2002 | Westrich et al. |
| 6,425,602 B1 | 7/2002 | Al-Amin et al. |
| 6,431,734 B1 | 8/2002 | Curry |
| 6,439,597 B1 | 8/2002 | Harada et al. |
| 6,450,571 B1 | 9/2002 | Canni et al. |
| 6,454,353 B1 | 9/2002 | Knaus |
| 6,457,741 B2 | 10/2002 | Seki et al. |
| 6,474,733 B1 | 11/2002 | Heilig et al. |
| 6,523,892 B1 | 2/2003 | Kage et al. |
| 6,523,902 B2 | 2/2003 | Robinson |
| 6,530,622 B1 | 3/2003 | Ekern et al. |
| 6,550,856 B1 | 4/2003 | Ganser et al. |
| 6,554,365 B2 | 4/2003 | Karschin et al. |
| 6,557,887 B2 | 5/2003 | Wohllebe |
| 6,561,540 B1 | 5/2003 | Hasegawa et al. |
| 6,565,150 B2 | 5/2003 | Fischer et al. |
| 6,565,153 B2 | 5/2003 | Hensel et al. |
| 6,568,754 B1 | 5/2003 | Norton et al. |
| 6,578,911 B2 | 6/2003 | Harada et al. |
| 6,588,838 B1 | 7/2003 | Dick, Jr. et al. |
| 6,595,586 B2 | 7/2003 | Brightbill et al. |
| 6,612,610 B1 | 9/2003 | Aoki et al. |
| 6,616,177 B2 | 9/2003 | Thomas et al. |
| 6,619,605 B2 | 9/2003 | Lambert |
| 6,619,737 B2 | 9/2003 | Kunkel et al. |
| 6,629,715 B2 | 10/2003 | Oh et al. |
| 6,637,818 B2 | 10/2003 | Williams |
| 6,672,666 B2 | 1/2004 | Stiller et al. |
| 6,682,059 B1 | 1/2004 | Daniels et al. |
| 6,682,140 B2 | 1/2004 | Minuth et al. |
| 6,695,406 B2 | 2/2004 | Plant |
| 6,698,832 B2 | 3/2004 | Boudinot |
| 6,719,373 B2 | 4/2004 | Zimmermann |
| 6,726,280 B1 | 4/2004 | Liao |
| 6,733,064 B2 | 5/2004 | Fox et al. |
| 6,736,452 B2 | 5/2004 | Aoki et al. |
| 6,746,077 B2 | 6/2004 | Klukowski |
| 6,758,522 B2 | 7/2004 | Ligon, Sr. et al. |
| 6,779,560 B1 | 8/2004 | Reis |
| 6,786,542 B1 | 9/2004 | Nuzzarello |
| 6,802,563 B1 | 10/2004 | Mysliwiec et al. |
| 6,808,230 B2 | 10/2004 | Buss et al. |
| 6,811,219 B2 | 11/2004 | Hudswell et al. |
| 6,820,640 B2 | 11/2004 | Hand et al. |
| 6,820,930 B2 | 11/2004 | Dellanno |
| 6,824,212 B2 | 11/2004 | Malsch et al. |
| 6,848,742 B1 | 2/2005 | Aoki et al. |
| 6,854,869 B1 | 2/2005 | Fernandez |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,890,030 B2 | 5/2005 | Wilkerson et al. |

(56) References Cited

U.S. PATENT DOCUMENTS

| | | | |
|---|---|---|---|
| 6,899,399 B2 | 5/2005 | Ali et al. |
| 6,905,173 B2 | 6/2005 | Tame et al. |
| 6,908,151 B2 | 6/2005 | Meeker et al. |
| 6,912,748 B2 | 7/2005 | VanSickle |
| 6,929,324 B2 | 8/2005 | Enomoto et al. |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,991,256 B2 | 1/2006 | Henderson et al. |
| 6,991,289 B2 | 1/2006 | House |
| 6,997,473 B2 | 2/2006 | Tanase et al. |
| 7,025,423 B2 | 4/2006 | Fujita et al. |
| 7,040,699 B2 | 5/2006 | Curran et al. |
| 7,055,904 B2 | 6/2006 | Skelly et al. |
| 7,059,678 B1 | 6/2006 | Taylor |
| 7,068,178 B2 | 6/2006 | Oh |
| 7,072,764 B2 | 7/2006 | Donath et al. |
| 7,093,898 B2 | 8/2006 | Ladron De Guevara |
| 7,100,978 B2 | 9/2006 | Ekern et al. |
| 7,100,992 B2 | 9/2006 | Bargheer et al. |
| 7,108,322 B2 | 9/2006 | Erker |
| 7,111,901 B2 | 9/2006 | Schlierf et al. |
| 7,125,077 B2 | 10/2006 | Frank |
| 7,131,694 B1 | 11/2006 | Buffa |
| 7,131,756 B2 | 11/2006 | Leslie et al. |
| 7,134,686 B2 | 11/2006 | Tracht et al. |
| 7,140,682 B2 | 11/2006 | Jaeger et al. |
| 7,143,658 B2 | 12/2006 | Schubert |
| 7,152,920 B2 | 12/2006 | Sugiyama et al. |
| 7,159,934 B2 | 1/2007 | Farquhar et al. |
| 7,159,938 B1 | 1/2007 | Shiraishi |
| 7,185,950 B2 | 3/2007 | Pettersson et al. |
| 7,195,274 B2 | 3/2007 | Tracht |
| 7,195,277 B2 | 3/2007 | Tracht et al. |
| 7,213,876 B2 | 5/2007 | Stoewe |
| 7,213,883 B2 | 5/2007 | Charnitski |
| 7,216,915 B2 | 5/2007 | Kämmerer et al. |
| 7,229,118 B2 | 6/2007 | Saberan et al. |
| 7,229,129 B2 | 6/2007 | White et al. |
| 7,234,771 B2 | 6/2007 | Nakhla |
| 7,261,316 B1 | 8/2007 | Salmo et al. |
| 7,261,371 B2 | 8/2007 | Thunissen et al. |
| 7,267,363 B2 | 9/2007 | Tredez |
| 7,284,768 B2 | 10/2007 | Tracht |
| 7,290,791 B2 | 11/2007 | Tracht |
| 7,293,831 B2 | 11/2007 | Greene |
| 7,311,681 B1 | 12/2007 | Vaccarella |
| 7,316,215 B1 | 1/2008 | Nino et al. |
| 7,322,651 B2 | 1/2008 | Makhsous et al. |
| 7,325,878 B1 | 2/2008 | Dehli |
| 7,341,309 B2 | 3/2008 | Penley et al. |
| 7,344,189 B2 | 3/2008 | Reed et al. |
| 7,344,195 B2 | 3/2008 | Folkert et al. |
| 7,347,444 B2 | 3/2008 | Wheelwright |
| 7,350,803 B2 | 4/2008 | Abramczyk et al. |
| 7,350,859 B2 | 4/2008 | Klukowski |
| 7,350,865 B2 | 4/2008 | Pearse |
| 7,357,412 B2 | 4/2008 | Tracht et al. |
| 7,357,454 B2 | 4/2008 | Schiener et al. |
| 7,382,240 B2 | 6/2008 | Egelhaaf |
| 7,387,339 B2 | 6/2008 | Bykov et al. |
| 7,393,005 B2 | 7/2008 | Inazu et al. |
| 7,401,852 B2 | 7/2008 | Humer et al. |
| 7,413,253 B2 | 8/2008 | Karlberg |
| 7,425,034 B2 | 9/2008 | Bajic et al. |
| 7,441,797 B2 | 10/2008 | Tracht et al. |
| 7,441,838 B2 | 10/2008 | Patwardhan |
| 7,445,292 B2 | 11/2008 | Moule |
| 7,467,823 B2 | 12/2008 | Hartwich |
| 7,478,869 B2 | 1/2009 | Lazanja et al. |
| 7,481,489 B2 * | 1/2009 | Demick ............ B60N 2/5825 297/218.1 |
| 7,488,040 B2 | 2/2009 | Dozsa-Farkas |
| 7,506,924 B2 | 3/2009 | Bargheer et al. |
| 7,506,938 B2 | 3/2009 | Brennan et al. |
| 7,517,015 B2 | 4/2009 | Terada et al. |
| 7,517,024 B2 | 4/2009 | Cvek |
| 7,523,888 B2 | 4/2009 | Ferry et al. |
| 7,530,633 B2 | 5/2009 | Yokota et al. |
| 7,540,529 B2 | 6/2009 | Tracht et al. |
| 7,543,888 B2 | 6/2009 | Kuno |
| 7,547,068 B2 | 6/2009 | Davis |
| 7,559,607 B2 * | 7/2009 | Archambault ......... B60N 2/449 297/284.3 |
| 7,562,934 B2 | 7/2009 | Swan et al. |
| 7,578,552 B2 | 8/2009 | Bajic et al. |
| 7,578,554 B2 | 8/2009 | Lee et al. |
| 7,597,398 B2 | 10/2009 | Lindsay |
| 7,604,294 B2 | 10/2009 | Santamaria |
| 7,611,199 B2 | 11/2009 | Michalak et al. |
| 7,614,693 B2 | 11/2009 | Ito |
| 7,637,568 B2 | 12/2009 | Meeker et al. |
| 7,640,090 B2 | 12/2009 | Uchida et al. |
| 7,641,281 B2 | 1/2010 | Grimm |
| 7,668,329 B2 | 2/2010 | Matsuhashi |
| 7,669,888 B2 | 3/2010 | Sato et al. |
| 7,669,925 B2 | 3/2010 | Beck et al. |
| 7,669,928 B2 | 3/2010 | Snyder |
| 7,669,929 B2 | 3/2010 | Simon et al. |
| 7,677,594 B2 | 3/2010 | Hazlewood et al. |
| 7,677,598 B1 | 3/2010 | Ryan et al. |
| 7,699,339 B2 | 4/2010 | Jang et al. |
| 7,712,833 B2 | 5/2010 | Ueda |
| 7,717,459 B2 | 5/2010 | Bostrom et al. |
| 7,717,509 B2 | 5/2010 | Kojima |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,552 B2 | 8/2010 | Breuninger et al. |
| 7,775,602 B2 | 8/2010 | Lazanja et al. |
| 7,784,819 B2 | 8/2010 | Lawall et al. |
| 7,784,863 B2 | 8/2010 | Fallen |
| 7,793,973 B2 | 9/2010 | Sato et al. |
| 7,794,012 B2 | 9/2010 | Szablewski |
| 7,798,570 B2 | 9/2010 | Kwiecinski et al. |
| 7,802,809 B2 | 9/2010 | Ryan et al. |
| 7,802,843 B2 | 9/2010 | Andersson et al. |
| 7,810,969 B2 | 10/2010 | Blackmore et al. |
| 7,819,470 B2 | 10/2010 | Humer et al. |
| 7,819,480 B2 | 10/2010 | Asbury et al. |
| 7,823,971 B2 | 11/2010 | Humer et al. |
| 7,845,729 B2 | 12/2010 | Yamada et al. |
| 7,850,235 B2 | 12/2010 | Veine et al. |
| 7,850,247 B2 | 12/2010 | Stauske et al. |
| 7,857,381 B2 | 12/2010 | Humer et al. |
| 7,862,113 B2 | 1/2011 | Knoll |
| 7,862,117 B2 | 1/2011 | Hutchinson et al. |
| 7,866,689 B2 | 1/2011 | Saberan |
| 7,871,126 B2 | 1/2011 | Becker et al. |
| 7,871,129 B2 | 1/2011 | Boes et al. |
| 7,878,535 B2 | 2/2011 | Rose et al. |
| 7,878,596 B2 | 2/2011 | Brunner et al. |
| 7,887,094 B2 | 2/2011 | Sakaida |
| 7,891,701 B2 | 2/2011 | Tracht et al. |
| 7,901,002 B2 | 3/2011 | Mashimo |
| 7,909,360 B2 | 3/2011 | Marriott et al. |
| 7,909,401 B2 | 3/2011 | Hofmann et al. |
| 7,909,403 B2 | 3/2011 | Lawall et al. |
| 7,922,142 B2 | 4/2011 | Koutsky et al. |
| 7,926,871 B2 | 4/2011 | Meixner et al. |
| 7,926,872 B2 | 4/2011 | Chida et al. |
| 7,931,294 B2 | 4/2011 | Okada et al. |
| 7,931,330 B2 | 4/2011 | Itou et al. |
| 7,938,440 B2 | 5/2011 | Kataoka et al. |
| 7,946,649 B2 | 5/2011 | Galbreath et al. |
| 7,959,225 B2 | 6/2011 | Humer et al. |
| 7,959,226 B2 | 6/2011 | Hattori et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,966,835 B2 | 6/2011 | Petrovski |
| 7,967,379 B2 | 6/2011 | Walters et al. |

(56) References Cited

U.S. PATENT DOCUMENTS

| | | |
|---|---|---|
| 7,971,931 B2 | 7/2011 | Lazanja et al. |
| 7,971,937 B2 | 7/2011 | Ishii et al. |
| 7,976,103 B2 | 7/2011 | Gamache et al. |
| 3,011,728 A1 | 9/2011 | Kohl et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,056,923 B2 | 11/2011 | Shimono |
| 8,075,053 B2 | 12/2011 | Tracht et al. |
| 8,100,471 B2 | 1/2012 | Lawall et al. |
| 8,109,569 B2 | 2/2012 | Mitchell |
| 8,111,147 B2 | 2/2012 | Litkouhi |
| 8,113,539 B2 | 2/2012 | Paruszkiewicz et al. |
| 8,123,246 B2 | 2/2012 | Gilbert et al. |
| 8,126,615 B2 | 2/2012 | McMillen et al. |
| D655,393 S | 3/2012 | Whitaker |
| 8,128,167 B2 | 3/2012 | Zhong et al. |
| 8,141,945 B2 | 3/2012 | Akaike et al. |
| 8,162,391 B2 | 4/2012 | Lazanja et al. |
| 8,162,392 B2 | 4/2012 | Humer et al. |
| 8,162,397 B2 | 4/2012 | Booth et al. |
| 8,167,370 B2 | 5/2012 | Arakawa et al. |
| 8,167,376 B2 | 5/2012 | Song |
| 8,177,256 B2 | 5/2012 | Smith et al. |
| 8,196,887 B2 | 6/2012 | Dahlbacka et al. |
| 8,201,883 B2 | 6/2012 | Wuerstlein et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,113 B2 | 7/2012 | Yamashita |
| 8,226,165 B2 | 7/2012 | Mizoi |
| 8,231,138 B2 | 7/2012 | Sadr et al. |
| 8,240,758 B2 | 8/2012 | Combest |
| 8,251,396 B2 | 8/2012 | Zothke et al. |
| 8,297,708 B2 | 10/2012 | Mizobata et al. |
| 8,328,227 B2 | 12/2012 | Shimono |
| 8,328,231 B2 | 12/2012 | Nakamura et al. |
| 8,336,910 B1 | 12/2012 | Kalisz et al. |
| 8,342,607 B2 | 1/2013 | Hofmann et al. |
| 8,348,338 B2 | 1/2013 | Galecka et al. |
| 8,360,517 B2 | 1/2013 | Lazanja et al. |
| 8,360,530 B2 | 1/2013 | Onoda et al. |
| 8,371,655 B2 | 2/2013 | Nonomiya |
| 8,388,061 B2 | 3/2013 | Saito et al. |
| 8,397,688 B2 | 3/2013 | Cunningham |
| 8,398,114 B2 | 3/2013 | Laframboise et al. |
| 8,403,410 B1 | 3/2013 | Pinger et al. |
| 8,408,646 B2 | 4/2013 | Harper et al. |
| 8,447,473 B2 | 5/2013 | Sugiyama et al. |
| 8,469,395 B2 | 6/2013 | Richez et al. |
| 8,474,778 B2 | 7/2013 | Jacobson |
| 8,474,917 B2 | 7/2013 | Line et al. |
| 8,511,748 B2 | 8/2013 | McLeod et al. |
| 8,516,842 B2 | 8/2013 | Petrovski |
| 8,534,760 B2 | 9/2013 | Kotz |
| 8,540,318 B2 | 9/2013 | Folkert et al. |
| 8,585,144 B2 | 11/2013 | Huttenhuis |
| 8,590,978 B2 | 11/2013 | Jaranson et al. |
| 8,602,493 B1 | 12/2013 | Chen et al. |
| 8,657,378 B2 | 2/2014 | Kunert et al. |
| 8,672,352 B2 | 3/2014 | Tracht et al. |
| 8,678,500 B2 | 3/2014 | Lem et al. |
| 8,696,067 B2 | 4/2014 | Galbreath et al. |
| 8,727,374 B1 * | 5/2014 | Line ................ B60R 21/207 280/728.3 |
| 8,752,894 B2 | 6/2014 | Trimbom et al. |
| 8,794,707 B2 | 8/2014 | Bocsanyi et al. |
| 8,807,594 B2 | 8/2014 | Mizobata |
| 8,827,371 B2 | 9/2014 | Brncick et al. |
| 8,899,683 B2 | 12/2014 | Ito |
| 8,905,431 B1 | 12/2014 | Line et al. |
| 8,967,663 B2 | 3/2015 | Seki et al. |
| 8,979,204 B2 | 3/2015 | Awata et al. |
| 9,096,157 B2 | 8/2015 | Line et al. |
| 9,102,247 B2 | 8/2015 | Li et al. |
| 9,126,504 B2 | 9/2015 | Line et al. |
| 9,126,508 B2 | 9/2015 | Line et al. |
| 9,193,289 B2 | 11/2015 | Takahashi et al. |
| 9,272,647 B2 | 3/2016 | Gawade et al. |
| 9,283,873 B2 | 3/2016 | Line et al. |
| 9,320,361 B2 | 4/2016 | Gaines et al. |
| 9,365,142 B1 | 6/2016 | Line et al. |
| 9,421,894 B2 | 8/2016 | Line et al. |
| 2001/0011812 A1 | 8/2001 | Seki et al. |
| 2002/0096915 A1 | 7/2002 | Haupt et al. |
| 2002/0113473 A1 | 8/2002 | Knaus |
| 2002/0145512 A1 | 10/2002 | Sleichter, III et al. |
| 2003/0023363 A1 | 1/2003 | Katz et al. |
| 2003/0025370 A1 | 2/2003 | Hensel et al. |
| 2003/0038517 A1 | 2/2003 | Moran et al. |
| 2003/0137178 A1 | 7/2003 | Craft et al. |
| 2003/0213105 A1 | 11/2003 | Bednarski |
| 2004/0012237 A1 | 1/2004 | Horiki et al. |
| 2004/0084937 A1 | 5/2004 | Berta |
| 2004/0108760 A1 | 6/2004 | McMillen |
| 2004/0129585 A1 | 7/2004 | Ballantine et al. |
| 2004/0144349 A1 | 7/2004 | Wampula et al. |
| 2004/0183351 A1 | 9/2004 | Johnson et al. |
| 2004/0195870 A1 | 10/2004 | Bohlender et al. |
| 2004/0212589 A1 | 10/2004 | Hall et al. |
| 2005/0035642 A1 | 2/2005 | Hake et al. |
| 2005/0077762 A1 | 4/2005 | Kraemer et al. |
| 2005/0082895 A1 | 4/2005 | Kimmig |
| 2005/0127734 A1 | 6/2005 | Veine et al. |
| 2005/0140193 A1 | 6/2005 | Skelly et al. |
| 2005/0179287 A1 | 8/2005 | Hankins |
| 2005/0179291 A1 | 8/2005 | Brodeur |
| 2005/0179306 A1 | 8/2005 | Inhite et al. |
| 2005/0184569 A1 | 8/2005 | Penley et al. |
| 2005/0189752 A1 | 9/2005 | Itoga et al. |
| 2005/0200166 A1 | 9/2005 | Noh |
| 2005/0248189 A1 | 11/2005 | Prasatek et al. |
| 2005/0253429 A1 | 11/2005 | Veine et al. |
| 2005/0258624 A1 | 11/2005 | Abraham et al. |
| 2006/0043777 A1 | 3/2006 | Friedman et al. |
| 2006/0113751 A1 | 6/2006 | Tracht et al. |
| 2006/0113762 A1 | 6/2006 | Tracht et al. |
| 2006/0113765 A1 | 6/2006 | Tracht |
| 2006/0152062 A1 | 7/2006 | Archambault et al. |
| 2006/0155429 A1 | 7/2006 | Boone et al. |
| 2006/0214487 A1 | 9/2006 | Holdampf et al. |
| 2006/0220434 A1 | 10/2006 | Schulz et al. |
| 2006/0244301 A1 | 11/2006 | Jeffries |
| 2007/0029853 A1 | 2/2007 | Forgatsch et al. |
| 2007/0090673 A1 | 4/2007 | Ito |
| 2007/0118259 A1 | 5/2007 | Chernoff et al. |
| 2007/0120401 A1 | 5/2007 | Minuth et al. |
| 2007/0138844 A1 | 6/2007 | Kim |
| 2007/0170707 A1 | 7/2007 | Sato et al. |
| 2007/0200398 A1 | 8/2007 | Wolas et al. |
| 2007/0241593 A1 | 10/2007 | Woerner |
| 2007/0296194 A1 | 12/2007 | Ridgway |
| 2008/0036258 A1 | 2/2008 | Holdampf et al. |
| 2008/0067850 A1 | 3/2008 | Stenstrom et al. |
| 2008/0122241 A1 | 5/2008 | Blackmore et al. |
| 2008/0136240 A1 | 6/2008 | Matthews et al. |
| 2008/0157577 A1 | 7/2008 | Lindsay |
| 2008/0174159 A1 | 7/2008 | Kojima et al. |
| 2008/0231099 A1 | 9/2008 | Szczepkowski et al. |
| 2008/0252111 A1 | 10/2008 | Rothkop et al. |
| 2009/0039690 A1 | 2/2009 | Simon et al. |
| 2009/0066122 A1 | 3/2009 | Minuth et al. |
| 2009/0085383 A1 | 4/2009 | Hicks et al. |
| 2009/0102255 A1 | 4/2009 | D'Agostini et al. |
| 2009/0140569 A1 | 6/2009 | Mashimo |
| 2009/0152909 A1 | 6/2009 | Andersson |
| 2009/0160167 A1 | 6/2009 | Itoga |
| 2009/0165263 A1 | 7/2009 | Smith |
| 2009/0195041 A1 | 8/2009 | Ito et al. |
| 2009/0224584 A1 | 9/2009 | Lawall et al. |
| 2009/0302660 A1 | 12/2009 | Karlberg et al. |
| 2009/0315372 A1 | 12/2009 | Tracht |
| 2009/0322124 A1 | 12/2009 | Barkow et al. |

(56) References Cited

U.S. PATENT DOCUMENTS

| | | |
|---|---|---|
| 2010/0007122 A1 | 1/2010 | Clauser et al. |
| 2010/0026066 A1 | 2/2010 | Graber et al. |
| 2010/0038937 A1 | 2/2010 | Andersson et al. |
| 2010/0102599 A1 | 4/2010 | Itou et al. |
| 2010/0109397 A1 | 5/2010 | Bandurski et al. |
| 2010/0109401 A1 | 5/2010 | Booth et al. |
| 2010/0117414 A1 | 5/2010 | Hwang et al. |
| 2010/0133794 A1 | 6/2010 | Tracht et al. |
| 2010/0140986 A1 | 6/2010 | Sawada |
| 2010/0140992 A1 | 6/2010 | Yamaguchi |
| 2010/0148546 A1 | 6/2010 | Demontis et al. |
| 2010/0148948 A1 | 6/2010 | Murphy et al. |
| 2010/0171346 A1* | 7/2010 | Laframboise ............ B29C 44/12 297/183.1 |
| 2010/0187881 A1 | 7/2010 | Fujita et al. |
| 2010/0201167 A1 | 8/2010 | Wieclawski |
| 2010/0207438 A1 | 8/2010 | Inoue et al. |
| 2010/0207443 A1 | 8/2010 | Brncick |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0286867 A1 | 11/2010 | Bergholz et al. |
| 2010/0295282 A1 | 11/2010 | Kim et al. |
| 2010/0301650 A1 | 12/2010 | Hong |
| 2010/0319796 A1 | 12/2010 | Whitaker |
| 2010/0320816 A1 | 12/2010 | Michalak |
| 2010/0327636 A1 | 12/2010 | Stoll et al. |
| 2011/0018498 A1 | 1/2011 | Soar |
| 2011/0055720 A1 | 3/2011 | Potter et al. |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1* | 5/2011 | Brncick ............ B60N 2/0232 297/284.2 |
| 2011/0133525 A1 | 6/2011 | Oota |
| 2011/0155084 A1 | 6/2011 | Sargeant |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0199200 A1 | 8/2011 | Lueke et al. |
| 2011/0215200 A1 | 9/2011 | Mejuhas |
| 2011/0248532 A1 | 10/2011 | Kim et al. |
| 2011/0254335 A1 | 10/2011 | Pradier et al. |
| 2011/0260506 A1 | 10/2011 | Kuno |
| 2011/0260509 A1 | 10/2011 | Siu |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2011/0309604 A1 | 12/2011 | Moore et al. |
| 2012/0013161 A1 | 1/2012 | Adams et al. |
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0041648 A1 | 2/2012 | Yamaguchi et al. |
| 2012/0043791 A1 | 2/2012 | Kojima |
| 2012/0049597 A1 | 3/2012 | Brewer et al. |
| 2012/0049599 A1 | 3/2012 | Barzen et al. |
| 2012/0063081 A1 | 3/2012 | Grunwald |
| 2012/0080914 A1 | 4/2012 | Wang |
| 2012/0081234 A1 | 4/2012 | Shaffer et al. |
| 2012/0081544 A1 | 4/2012 | Wee |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0112515 A1 | 5/2012 | Labish |
| 2012/0119551 A1* | 5/2012 | Brncick ............ B60N 2/643 297/284.2 |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0161481 A1 | 6/2012 | Tache et al. |
| 2012/0162891 A1 | 6/2012 | Tranchina et al. |
| 2012/0167845 A1 | 7/2012 | Sands et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0222900 A1 | 9/2012 | Rodney et al. |
| 2012/0248833 A1 | 10/2012 | Hontz et al. |
| 2012/0248839 A1 | 10/2012 | Fujita et al. |
| 2012/0261974 A1 | 10/2012 | Yoshizawa et al. |
| 2012/0267878 A1 | 10/2012 | Kalisz et al. |
| 2012/0299342 A1 | 11/2012 | Mizobata |
| 2013/0015643 A1 | 1/2013 | Gorman et al. |
| 2013/0076092 A1* | 3/2013 | Kulkarni ............ B60N 2/643 297/301.1 |
| 2013/0119646 A1 | 5/2013 | Tracht |
| 2013/0119715 A1 | 5/2013 | Medoro et al. |
| 2013/0119723 A1 | 5/2013 | Nitsuma |
| 2013/0119724 A1 | 5/2013 | Adachi et al. |
| 2013/0119741 A1 | 5/2013 | Medoro et al. |
| 2013/0134749 A1 | 5/2013 | Awata et al. |
| 2013/0181492 A1 | 7/2013 | Prescott et al. |
| 2013/0220877 A1 | 8/2013 | Stern |
| 2013/0241255 A1 | 9/2013 | Kulkarni et al. |
| 2013/0285426 A1 | 10/2013 | Arant et al. |
| 2013/0306825 A1 | 11/2013 | Brodersen |
| 2013/0320730 A1 | 12/2013 | Aselage |
| 2013/0320742 A1 | 12/2013 | Murolo et al. |
| 2013/0341975 A1 | 12/2013 | Schneider et al. |
| 2013/0342366 A1 | 12/2013 | Kiefer et al. |
| 2013/0343072 A1 | 12/2013 | Ehrmann et al. |
| 2014/0032043 A1 | 1/2014 | Line et al. |
| 2014/0042781 A1 | 2/2014 | Reeves |
| 2014/0054944 A1 | 2/2014 | Locke et al. |
| 2014/0058305 A1 | 2/2014 | Batterson et al. |
| 2014/0062147 A1 | 3/2014 | Bashir et al. |
| 2014/0070594 A1 | 3/2014 | Awata et al. |
| 2014/0077565 A1 | 3/2014 | Baumgarten et al. |
| 2014/0135991 A1 | 5/2014 | Summer et al. |
| 2014/0139979 A1 | 5/2014 | Blazic |
| 2014/0152057 A1 | 6/2014 | Truant et al. |
| 2014/0167465 A1 | 6/2014 | Sakata et al. |
| 2014/0180181 A1 | 6/2014 | von Oepen et al. |
| 2014/0203606 A1 | 7/2014 | Line et al. |
| 2014/0203610 A1 | 7/2014 | Line et al. |
| 2014/0203617 A1 | 7/2014 | Line et al. |
| 2014/0265506 A1 | 9/2014 | McMillen et al. |
| 2014/0300145 A1 | 10/2014 | Beroth et al. |
| 2014/0300167 A1 | 10/2014 | Datta |
| 2014/0361571 A1 | 12/2014 | Line et al. |
| 2014/0375100 A1 | 12/2014 | Reese |
| 2015/0048664 A1* | 2/2015 | Sano ............ A47C 7/38 297/391 |
| 2015/0108816 A1 | 4/2015 | Dry et al. |
| 2015/0157481 A1 | 6/2015 | Whitaker et al. |
| 2015/0157482 A1 | 6/2015 | Batterson et al. |
| 2015/0165935 A1 | 6/2015 | Sachs et al. |
| 2015/0283970 A1 | 10/2015 | Line et al. |

FOREIGN PATENT DOCUMENTS

| | | |
|---|---|---|
| DE | 3115269 A1 | 10/1982 |
| DE | 3119867 A1 | 12/1982 |
| DE | 3139945 A1 | 4/1983 |
| DE | 3519351 A1 | 12/1986 |
| DE | 3735428 A1 | 5/1989 |
| DE | 3841688 A1 | 6/1990 |
| DE | 4403071 A1 | 8/1994 |
| DE | 9415511 U1 | 11/1994 |
| DE | 19857386 A1 | 6/2000 |
| DE | 10106238 A1 | 9/2002 |
| DE | 10201836 A1 | 8/2003 |
| DE | 10331612 A1 | 2/2005 |
| DE | 102004037069 A1 | 4/2005 |
| DE | 102006061226 A1 | 6/2008 |
| DE | 102010024180 A1 | 2/2011 |
| DE | 102010024544 A1 | 12/2011 |

(56) References Cited

FOREIGN PATENT DOCUMENTS

| | | |
|---|---|---|
| DE | 102012006074 A1 | 11/2012 |
| DE | 102012011226 A1 | 12/2012 |
| EP | 0174884 B1 | 9/1987 |
| EP | 0386890 A1 | 9/1990 |
| EP | 0518830 A1 | 12/1992 |
| EP | 0627339 A1 | 12/1994 |
| EP | 0670240 A1 | 9/1995 |
| EP | 0754590 | 1/1997 |
| EP | 0754590 A2 | 1/1997 |
| EP | 0594526 B1 | 9/1997 |
| EP | 0921033 A2 | 6/1999 |
| EP | 1077154 A2 | 2/2001 |
| EP | 0926969 | 1/2002 |
| EP | 0926969 B1 | 1/2002 |
| EP | 1266794 A2 | 12/2002 |
| EP | 1325838 A1 | 7/2003 |
| EP | 1266794 | 3/2004 |
| EP | 1462318 A1 | 9/2004 |
| EP | 1123834 | 10/2004 |
| EP | 1123834 B1 | 10/2004 |
| EP | 1002693 B1 | 9/2005 |
| EP | 1050429 | 10/2005 |
| EP | 1050429 B1 | 10/2005 |
| EP | 1084901 | 6/2006 |
| EP | 1084901 B1 | 6/2006 |
| EP | 1674333 A1 | 6/2006 |
| EP | 1674333 | 8/2007 |
| EP | 1674333 B1 | 8/2007 |
| EP | 1839932 A2 | 10/2007 |
| EP | 1950085 | 12/2008 |
| EP | 1950085 A3 | 12/2008 |
| EP | 1329356 | 11/2009 |
| EP | 1329356 B1 | 11/2009 |
| EP | 2289732 A1 | 3/2011 |
| EP | 2423040 A2 | 2/2012 |
| EP | 2534979 A1 | 12/2012 |
| EP | 2565070 A2 | 3/2013 |
| EP | 2574498 A1 | 4/2013 |
| EP | 2743124 A1 | 6/2014 |
| ES | 2107995 T1 | 12/1997 |
| FR | 2562003 A1 | 10/1985 |
| FR | 2875753 A1 | 3/2006 |
| GB | 1260717 A | 1/1972 |
| GB | 2011254 A | 7/1979 |
| GB | 2403139 A | 12/2004 |
| GB | 2430420 B | 3/2009 |
| JP | 61036029 A | 2/1986 |
| JP | 05115331 A | 5/1993 |
| JP | 2008189176 A | 8/2008 |
| JP | 2009096422 A | 5/2009 |
| JP | 201178557 A | 4/2011 |
| JP | 2011098588 A | 5/2011 |
| JP | 2011251573 A | 12/2011 |
| KR | 20050110301 A | 11/2005 |
| KR | 20080066428 A | 7/2008 |
| KR | 20100019390 A | 2/2010 |
| KR | 1020110051692 A | 5/2011 |
| KR | 101180702 B1 | 9/2012 |
| WO | WO9511818 | 5/1995 |
| WO | WO9511818 A1 | 5/1995 |
| WO | 9534449 A1 | 12/1995 |
| WO | 9815435 A1 | 4/1998 |
| WO | 9831992 A1 | 7/1998 |
| WO | 9919708 | 4/1999 |
| WO | WO9958022 | 11/1999 |
| WO | WO9958022 A1 | 11/1999 |
| WO | 0021797 A1 | 4/2000 |
| WO | 0144026 A1 | 6/2001 |
| WO | WO2006131189 | 12/2006 |
| WO | WO2006131189 A1 | 12/2006 |
| WO | 2007009893 A2 | 1/2007 |
| WO | WO2007028015 A2 | 3/2007 |
| WO | WO2007028015 | 8/2007 |
| WO | 2008019981 A1 | 2/2008 |
| WO | WO2008073285 | 6/2008 |
| WO | WO2008073285 A1 | 6/2008 |
| WO | 2010096307 A1 | 8/2010 |
| WO | WO2011021952 | 2/2011 |
| WO | WO2011021952 A1 | 2/2011 |
| WO | 2011068684 A1 | 6/2011 |
| WO | WO2012008904 | 1/2012 |
| WO | WO2012008904 A1 | 1/2012 |
| WO | 2012138699 A1 | 10/2012 |
| WO | 2013040085 A2 | 3/2013 |
| WO | 2013070905 A1 | 5/2013 |
| WO | 2013101644 A1 | 7/2013 |
| WO | 2014047417 A1 | 3/2014 |

OTHER PUBLICATIONS

"Imola Pro-fit", Cobra, (http://cobra.subesports.com/products/cat/seats/brand/Cobra/prodID/656), Date unknown, 2 pages.

M. Grujicic et al., "Seat-cushion and soft-tissue material modeling and a finite element investigation of the seating comfort for passenger-vehicle occupants," Materials and Design 30 (2009) 4273-4285.

"Thigh Support for Tall Drivers," http://cars.about.com/od/infiniti/ig/2009-Infiniti-G37-Coupe-pics/2008-G37-cpe-thigh-support.htm (1 page) [Accessed from the internet Apr. 10, 2013].

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

ecoustics.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (https://www.subesports.com/cobra/imola-pro-fit/cob-6000), 2001-2017, 4 pages.

Freedman Seating Company, "GO SEAT," http://www.freedmanseating.com/images/uploads/files/GOSeat_Brochure_10-19.pdf, accessed Apr. 27, 2017, 2 pgs.

Metro Magazine, "Vehicle Seating Manufacturers Offer Flexible Dseign Options, Enhanced Construction," http://www.metro-magazine.com/article/prinl/2012/01/vehicle-seating-manufacturers-offer-flexible-design-options-enahnced-construction.aspx, Jan. 2012, 3 pgs.

"Seat Comfort Systems", Installation Manual, KIT P/N: SCSOOOOOC3, http://www.techwebasto.com/accessories_main/seat_accessories/g_scs_vent_install.pdf, accessed Apr. 27, 2017, 7 pgs.

Car Reviews, "Audi A4 Saloon RS4", http://www.theaa.com/allaboutcars/cartestreports/2006037.html, Apr. 2006, 5 pgs.

Recaro GmbH & Co. KG, "Seat Range", ID No. 7218054, Mar. 2010, 21 pgs.

Kelley Blue Book, "2011 Mercedes-Benz CL-Class", http://www.kbb.com/mercedes-benz/cl-class/2011-mercedes-benz-cl-class/, Feb. 28, 2013, 5 pgs.

Lexus, "The all-new Lexus 2013", lexus.com P2-332, Feb. 2012, 13 pgs.

Mercedes-Benz, "Interior comfort—spoilt for choice", http://www.zungfu.com/pc_E_saloon.comfort.1.shtml, Feb. 28, 2013, 3 pgs.

Rostra Precision Controls Inc., "Universal Lumbar Installation Instructions", http://www.rostra.com/manuals/form3132F.pdf, Nov. 2, 2007, 8 pgs.

"Seats", http://www.bavarianmw.com/guide-4400.html, www.bmwmanuals.org, 2012, 5 pgs.

(56) References Cited

OTHER PUBLICATIONS

Mercedes-Benz, "Seat belts and airbags", http://www.mbusa.com/vcm/MB/DigitalAssets/pdfmb/serviceandparts/seatbelts_airbags.pdf, Oct. 27, 2005, 11 pgs.
SAE International, "Capacitive Sensors Increase Safety, Comfort", http://sae.org/automag/technewsletter/071106Electronics/04.htm, Jun. 13, 2013, 3 pages.
General Motors LLC, "2013 Chevrolet Spark Owner Manual," copyright 2012, 356 pages.
Matthew W Ing, United States Patent and Trademark Office, Non Final Office Communication re U.S. Appl. No. 13/749,561, dated Oct. 16, 2015, 33 pages.
Richard A Lowry, United States Patent and Trademark Office, Non Final Office Communication re U.S. Appl. No. 13/748,847, dated Sep. 10, 2014, 14 pages.
David E Allred, United States Patent and Trademark Office, Non Final Office Communication re U.S. Appl. No. 13/748,857, dated Aug. 25, 2014, 13 pages.
Timothy J Brindley, United States Patent and Trademark Office, Final Office Communication re U.S. Appl. No. 13/749,568, dated Mar. 26, 2015, 9 pages.
Timothy J Brindley, United States Patent and Trademark Office, Non Final Office Communication re U.S. Appl. No. 13/749,568, dated Sep. 8, 2014, 9 pages.
Milton Nelson Jr., United States Patent and Trademark Office, Final Office Communication re U.S. Appl. No. 13/749,572, dated Mar. 3, 2015, 13 pages.
Milton Nelson Jr., United States Patent and Trademark Office, Non Final Office Communication re U.S. Appl. No. 13/749,572, dated Sep. 30, 2014, 20 pages.
Nicole T Verley, United States Patent and Trademark Office, Non Final Office Communication re U.S. Appl. No. 13/749,589, dated Oct. 4, 2013, 12 pages.
Timothy J Brindley, United States Patent and Trademark Office, Non Final Office Communication re U.S. Appl. No. 13/749,595, dated Aug. 28, 2014, 10 pages.
Timothy J Brindley, United States Patent and Trademark Office, Final Office Communication re U.S. Appl. No. 13/749,595, dated Jan. 12, 2015, 10 pages.
Timothy J Brindley, United States Patent and Trademark Office, Non Final Office Communication re U.S. Appl. No. 13/749,584, dated Sep. 15, 2014, 9 pages.
Yolanda G Giacoman, United States Patent and Trademark Office, Final Office Communication re U.S. Appl. No. 13/748,862, dated Dec. 30, 2015, 10 pages.
Yolanda G Giacoman, United States Patent and Trademark Office, Non Final Office Communication re U.S. Appl. No. 13/748,862, dated Aug. 13, 2015, 9 pages.
Yolanda G Giacoman, United States Patent and Trademark Office, Final Office Communication re U.S. Appl. No. 13/748,862, dated Mar. 10, 2015, 19 pages.
Yolanda G Giacoman, United States Patent and Trademark Office, Non Final Office Communication re U.S. Appl. No. 13/748,862, dated Sep. 25, 2014, 16 pages.
Milton Nelson Jr., United States Patent and Trademark Office, Non Final Office Communication re U.S. Appl. No. 13/749,602, dated Sep. 19, 2014, 9 pages.
Melissa Ann Black, United States Patent and Trademark Office, Non Final Office Communication re U.S. Appl. No. 13/914,666, dated Mar. 13, 2015, 6 pages.
Philip F Gabler, United States Patent and Trademark Office, Non Final Office Communication re U.S. Appl. No. 14/025,483, dated Dec. 17, 2014, 8 pages.
Philip F Gabler, United States Patent and Trademark Office, Final Office Communication re U.S. Appl. No. 14/025,483, dated Apr. 23, 2015, 10 pages.
Philip F Gabler, United States Patent and Trademark Office, Non Final Office Communication re U.S. Appl. No. 14/025,483, dated Aug. 18, 2015, 14 pages.
Philip F Gabler, United States Patent and Trademark Office, Final Office Communication re U.S. Appl. No. 14/025,483, dated Dec. 18, 2015, 14 pages.
Peter R Brown, United States Patent and Trademark Office, Final Office Communication re U.S. Appl. No. 14/104,780, dated Dec. 1, 2015, 5 pages.
Peter R Brown, United States Patent and Trademark Office, Non Final Office Communication re U.S. Appl. No. 14/104,780, dated Jun. 29, 2015, 9 pages.
Nicole T Verley, United States Patent and Trademark Office, Advisory Action for U.S. Appl. No. 14/056,005, dated Sep. 30, 2015, 3 pages.
Nicole T Verley, United States Patent and Trademark Office, Final Office Communication re U.S. Appl. No. 14/056,005, dated Jun. 10, 2015, 8 pages.
Nicole T Verley, United States Patent and Trademark Office, Non Final Office Communication re U.S. Appl. No. 14/056,005, dated Mar. 2, 2015, 8 pages.
Peter R Brown, United States Patent and Trademark Office, Non Final Office Communication re U.S. Appl. No. 14/056,000, dated Mar. 4, 2015, 7 pages.
Peter R Brown, United States Patent and Trademark Office, Non Final Office Communication re U.S. Appl. No.14/056,000, dated Oct. 1, 2014, 8 pages.
Philip F Gabler, United States Patent and Trademark Office, Final Office Communication re U.S. Appl. No. 14/076,893, dated Sep. 29, 2015, 13 pages.
Philip F Gabler, United States Patent and Trademark Office, Non Final Office Communication re U.S. Appl. No. 14/076,893, dated Apr. 21, 2015, 12 pages.
David E Allred, United States Patent and Trademark Office, Non Final Office Communication re U.S. Appl. No. 14/063,647, dated Aug. 18, 2015, 19 pages.
Matthew W Ing, United States Patent and Trademark Office, Non Final Office Communication re U.S. Appl. No. 14/609,092, dated Oct. 19, 2015, 11 pages.
Alexander Scott Harrison, United States Patent and Trademark Office, Final Office Communication re U.S. Appl. No. 14/243,027, dated Jan. 20, 2016, 17 pages.
Alexander Scott Harrison, United States Patent and Trademark Office, Non Final Office Communication re U.S. Appl. No. 14/243,027, dated Aug. 13, 2015, 15 pages.
Ryan D Kwiecinski, United States Patent and Trademark Office, Non Final Office Communication re U.S. Appl. No. 14/230,961, dated Dec. 24, 2015, 12 pages.
Philip F Gabler, United States Patent and Trademark Office, Final Office Communication re U.S. Appl. No. 14/257,655, dated Dec. 18, 2015, 10 pages.
Philip F Gabler, United States Patent and Trademark Office, Non Final Office Communication re U.S. Appl. No. 14/257,655, dated Aug. 20, 2015, 10 pages.
Syed A Islam, United States Patent and Trademark Office, Final Office Communication re U.S. Appl. No. 14/275,368, dated Nov. 13, 2015, 13 pages.
Syed A Islam, United States Patent and Trademark Office, Non Final Office Communication re U.S. Appl. No. 14/275,368, dated May 6, 2015, 10 pages.
Laurie K Cranmer, United States Patent and Trademark Office, Non Final Office Communication re U.S. Appl. No. 14/505,675, dated Aug. 31, 2015, 7 pages.
Rodney Barnett White, United States Patent and Trademark Office, Non Final Office Communication re U.S. Appl. No. 14/600,166, dated Nov. 2, 2015, 7 pages.
Rodney Barnett White, United States Patent and Trademark Office, Final Office Communication re U.S. Appl. No. 14/534,296, dated Dec. 11, 2105, 14 pages.
Rodney Barnett White, United States Patent and Trademark Office, Non Final Office Communication re U.S. Appl. No. 14/534,296, dated Aug. 26, 2015, 13 pages.
Sanjeev Malhotra, United States Patent and Trademark Office, Non Final Office Communication re U.S. Appl. No. 14/534,285, dated Sep. 23, 2015, 14 pages.

(56) References Cited

OTHER PUBLICATIONS

Nicole T Verley, United States Patent and Trademark Office, Non Final Office Communication re U.S. Appl. No. 14/635,025, dated Dec. 4, 2015, 8 pages.

* cited by examiner

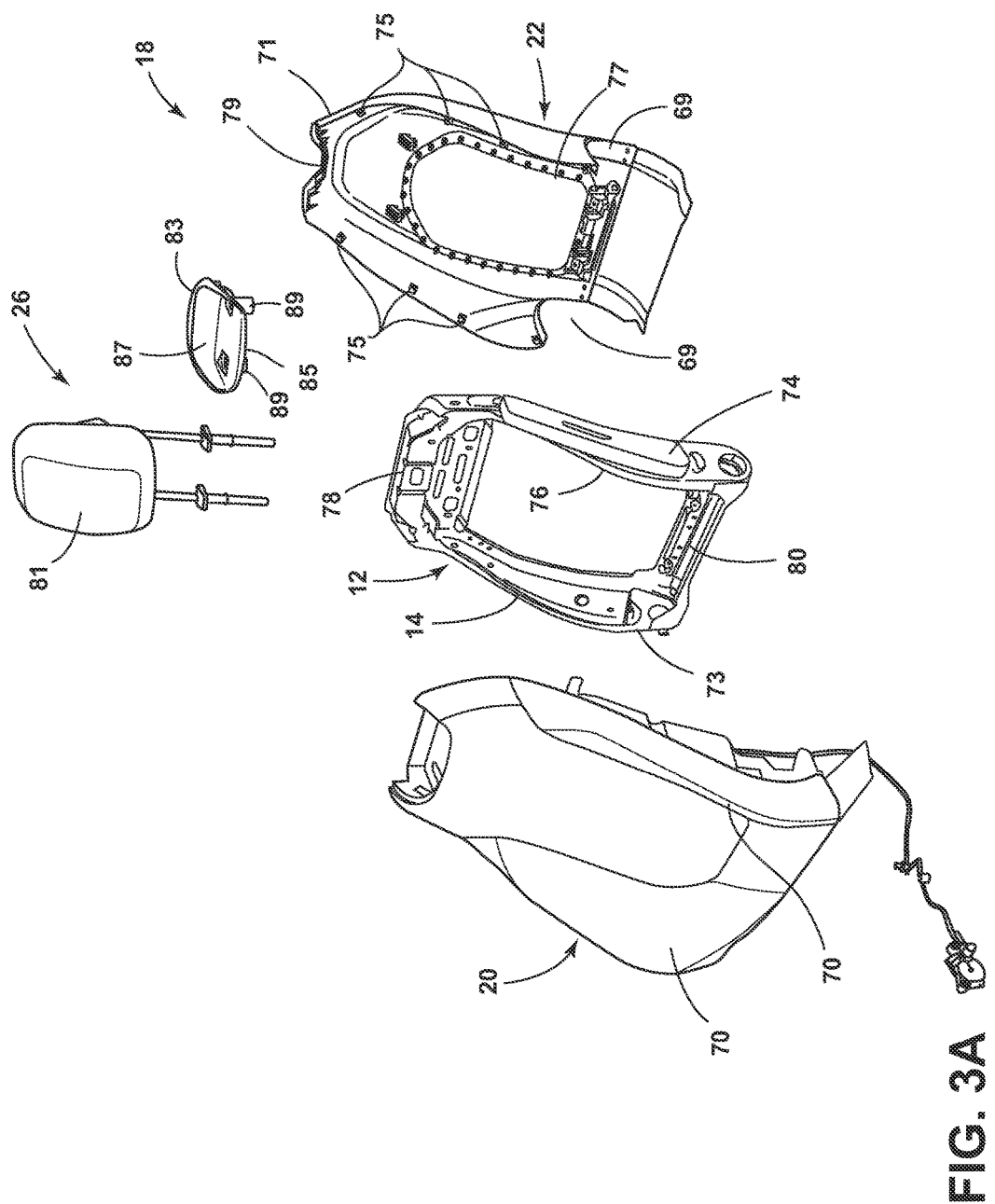

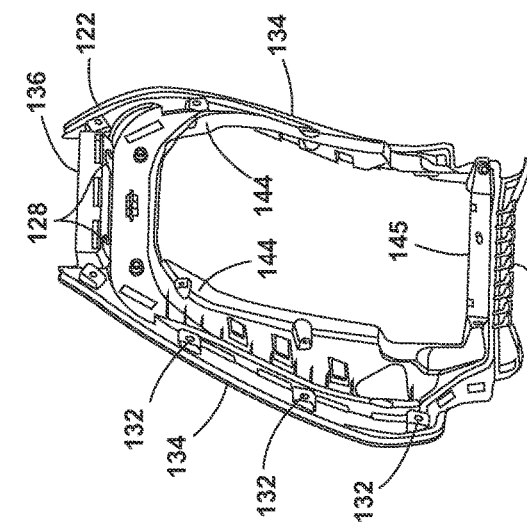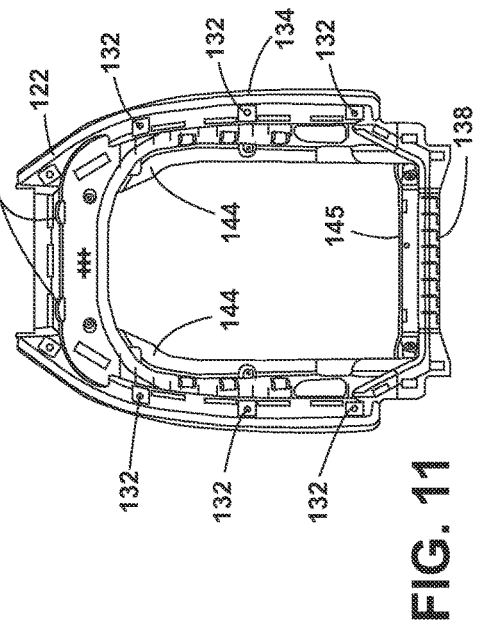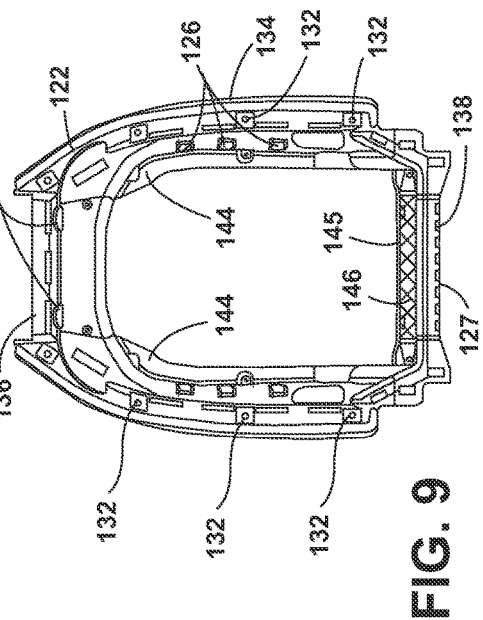

BACK CUSHION MODULE FOR A VEHICLE SEATING ASSEMBLY

FIELD OF THE DISCLOSURE

The present invention generally relates to a back cushion, and more particularly to a back cushion module for a vehicle seating assembly.

BACKGROUND OF THE DISCLOSURE

Vehicle seating assemblies typically include a seatback to support a back of a passenger in an upright sitting position and various reclined positions. Similar to other portions of a vehicle seating assembly, seatbacks are commonly designed to support a passenger in the upright sitting position upon acceleration, change in direction, and collision of the vehicle. Accordingly, seatbacks are substantially rigid and sizeable in construction.

SUMMARY OF THE DISCLOSURE

According to another aspect of the present disclosure, a vehicle seating assembly includes a seating frame defined by a seatback frame and a seat frame. A plurality of distinct assembly modules are configured for attachment with the seating frame. The plurality of distinct assembly modules include a back cushion module, a hard back module, a seat cushion module, and a headrest module. The back cushion module and hard back module are operably coupled together. The headrest module extends over and operably couples the back cushion module with the seat cushion module to substantially encompass the seating frame. The seat cushion module is positioned on the seat frame in front of the seatback frame. First and second side trim pieces are configured to extend over the seat frame concealing side portions of the seat cushion module.

According to yet another aspect of the present disclosure, a vehicle seating assembly includes a seatback frame encompassed by a plurality of distinct assembly modules including a back cushion module, a hard back module, a seat cushion module, and a headrest module. The back cushion module and hard back module are operably coupled together. The headrest module extends over and operably couples the back cushion module with the seat cushion module to substantially encompass the seating frame.

According to one aspect of the present disclosure, a method of making a vehicle seating assembly includes constructing a seating assembly frame having a seatback frame. A plurality of distinct assembly modules are provided that include a back cushion module, a hard back module, and a headrest module. The back cushion module and hard back module are coupled to conceal the seatback frame. A base of the headrest module is coupled with a top of the back cushion module and the seat cushion module.

According to still another aspect of the present disclosure, a vehicle seating assembly includes a plurality of distinct assembly modules that are constructed at a remote site and brought to an assembly plant for final construction. The distinct assembly modules include a back cushion module, a hard back module, a seat cushion module, and a headrest module. Each of the modules includes quick-attach fastener arrangements, such that minimal tools are required to assemble the seatback. In addition, as a result of preassembly of each of the modules, the vehicle seating assembly can be constructed in minimal time and at minimal cost.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 3A is a front perspective partially exploded view of the seatback of FIG. 3, illustrating a back cushion module, a hard back module, and a headrest module separated from the underlying frame;

FIG. 8 is a front perspective view of a composite back carrier of the back cushion module;

FIG. 9 is a front elevational view of the composite back carrier of FIG. 8;

FIG. 10 is a rear perspective view of the composite back carrier of FIG. 8;

FIG. 11 is a rear elevational view of the composite back carrier of FIG. 8;

DETAILED DESCRIPTION OF THE EMBODIMENTS

Figure 1:
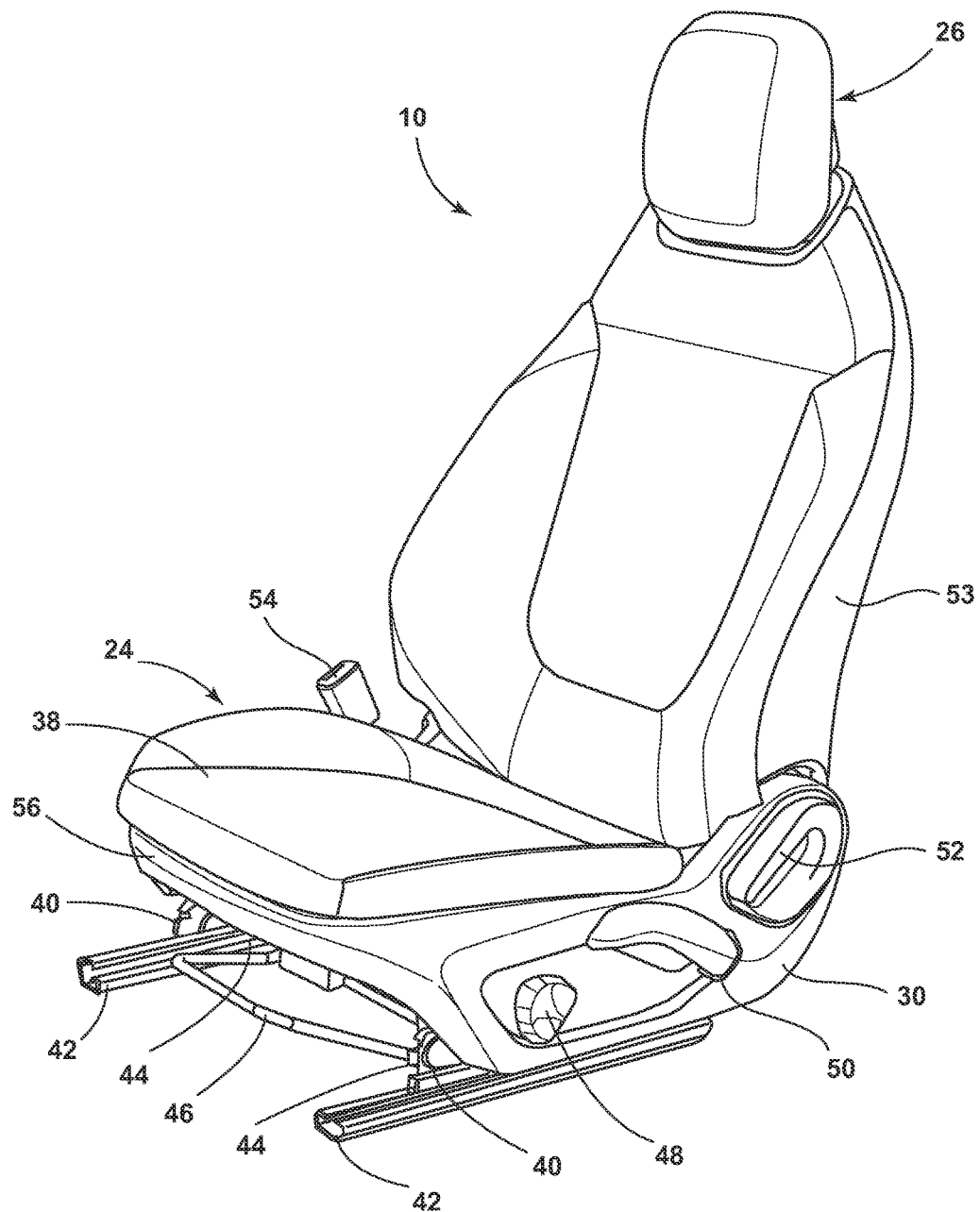
FIG. 1 is a front perspective view of one embodiment of a vehicle seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-16, reference numeral 10 generally designates a vehicle seating assembly that includes a seating frame 12 defining a seatback frame 14 and a seat frame 16. A plurality of distinct assembly modules 18 are configured for attachment with the seating frame 12. The plurality of distinct assembly modules 18 include a back cushion module 20, a hard back module 22, a seat cushion module 24, and a headrest module 26. The back cushion module 20 and the hard back module 22 are operably coupled together. The headrest module 26 extends over and operably couples the back cushion module 20 with the seat cushion module 24 to substantially encompass the seating frame 12. The seat cushion module 24 is positioned on the seat frame 16 in front of the seatback frame 14. Side trim pieces 30 are configured to extend over the seat frame 16 concealing side portions 34 of the seat cushion module 24.

Figure 2:
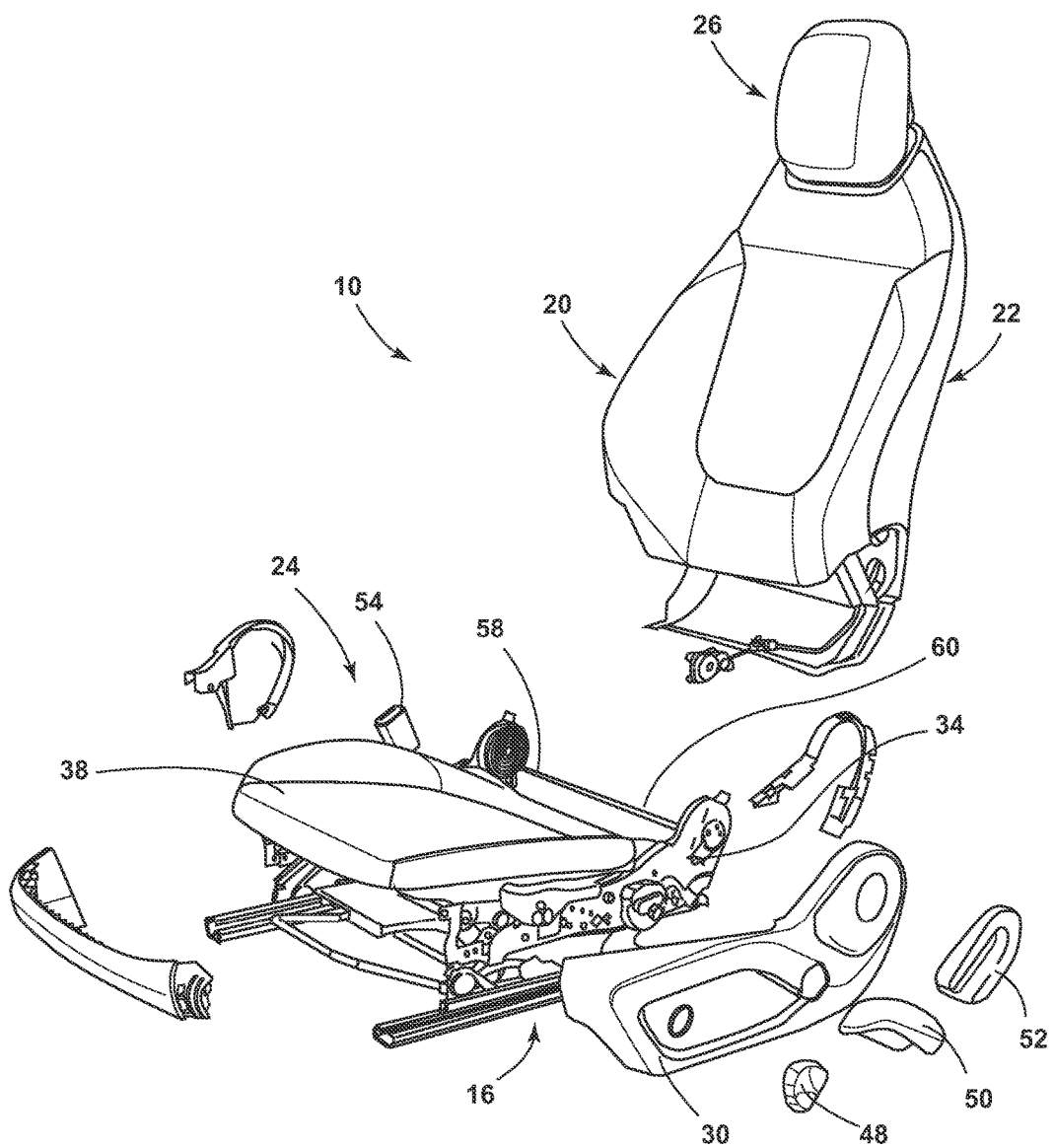
FIG. 2 is a front perspective partially exploded view of the vehicle seating assembly of FIG. 1.

With reference to FIGS. 1 and 2, the vehicle seating assembly 10 is configured for installation in a vehicle, such as a car, a truck, or a van. A seat base 38 of the vehicle seating assembly 10 is supported on a rail slide assembly 40 that allows for fore and aft movement of the vehicle seating assembly 10 relative to the vehicle. Rails 42 are secured with a floor of the vehicle, while slides 44 are operably coupled with the vehicle seating assembly 10. The slides 44 are in sliding engagement with the rails 42. The slides 44 can be adjusted and locked by a user using a forward slide control 46. In addition, a multitude of side controls, including a lumbar support control 48, a thigh support control 50, and a seatback pivot control 52 that allows for pivoting movement of a seatback 53 are provided proximate the seat cushion module 24, and allow for adjustment of the seatback 53 and the seat base 38 to accommodate passengers. A receiver 54 for a seatbelt assembly is disposed on the vehicle seating assembly 10 to secure a passenger during a collision event. In addition, a forward trim component 56 and the side trim pieces 30 are disposed about the seat base 38. The trim components 56 cover the seat frame 16 and structural components of the seat base 38 and the seat cushion module 24. As illustrated in FIG. 2, the seatback 53 is pivotal relative to the seat base 38 about a pivot rod (or torsion bar) 58 proximate a rear portion 60 of the seat base 38.

Figure 3:
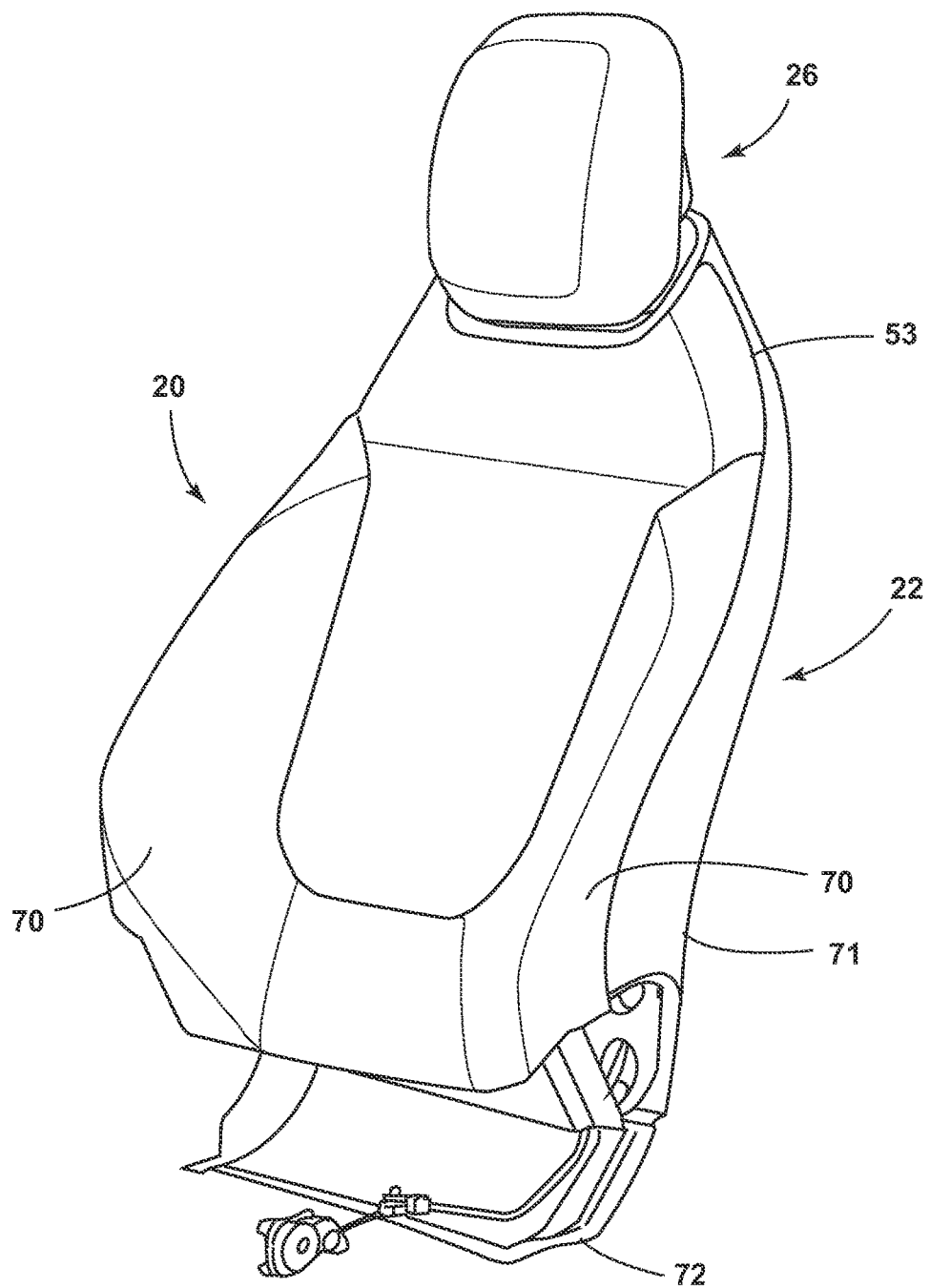
FIG. 3 is a front perspective view of one embodiment of a seatback of the present disclosure.

Turning now to FIGS. 3 and 3A, the seatback 53 is operably coupled with the seat base 38 and includes seatback side bolsters 70 that cradle a passenger resting against the seatback 53. The bolsters 70 are formed in the back cushion module 20 and may be partially supported by the hard back module 22. The hard back module 22, as illustrated in FIG. 3, includes a hard back panel 71 having a lower lip 72 that extends below the remainder of the seatback 53 as well as the seat cushion module 24 and which partially wraps around a rear portion of the seat cushion module 24. In addition, the hard back module 22 includes scalloped sections 69 on a lower portion thereof. The scalloped sections 69 are configured to accommodate the recliner mechanism associated with the relative inclination of the seatback 53. The hard back module 22 also includes a plurality of fastener mechanisms 75 disposed about a periphery of the hard back module 22. The fastener mechanisms 75 allow for direct connection of the hard back panel 71 to the back cushion module 20. Consequently, the hard back panel 71 abuts, but does not couple directly with, the seatback frame 14. Also, the hard back module 22 has a centrally-located wall 77 configured as a pocket to provide additional storage to passengers. The wall 77 may be constructed of the same material or different material than the hard back panel 71. A gap 79 is formed at a top portion of the hard back panel 71, and is configured to accommodate the headrest module 26.

As illustrated in FIG. 3A, the back cushion module 20, the headrest module 26, and the hard back module 22, encompass the seatback frame 14 and a side airbag 74, such that the seatback frame 14 is not visible after installation of the back cushion module 20, the headrest module 26, and the hard back module 22. The seatback frame 14 includes an inboard side support 73, an outboard side support 76, and top and bottom cross members 78, 80, respectively. Notably, the headrest module 26 includes a headrest 81 with engagement posts 64 configured to be inserted through a headrest tray 83 and into the top cross member 78 of the seatback frame 14. The headrest tray 83 includes a downwardly tipped front lip 85 and a rear upwardly extending back wall 87. The headrest tray 83 also includes two downwardly extending supports 89 that engage the seatback frame 14 and back cushion module 20. Additionally, the side airbag 74 is disposed on the outboard side support 76 of the seatback frame 14 and configured to deploy between the back cushion module 20 and the hard back module 22.

Figure 4:
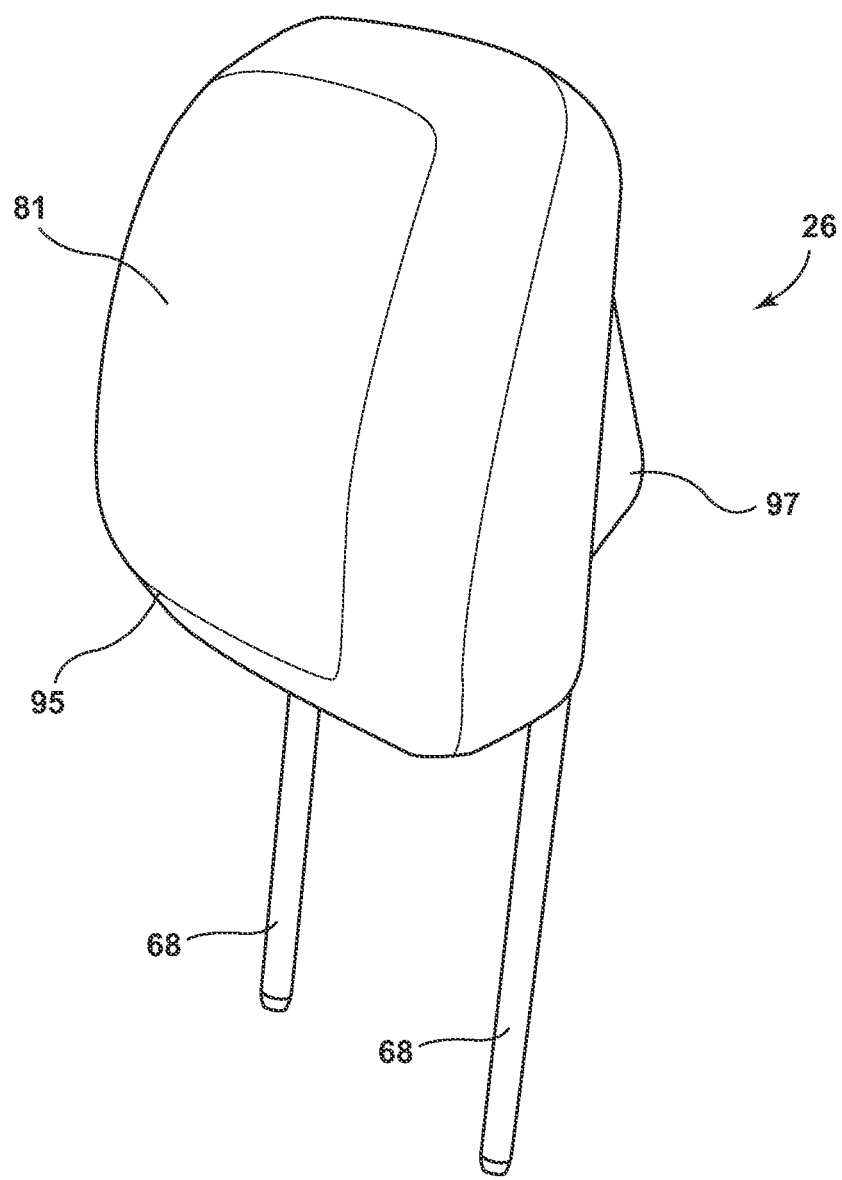
FIG. 4 is a front perspective view of a headrest module of the present disclosure.
Figure 4A:
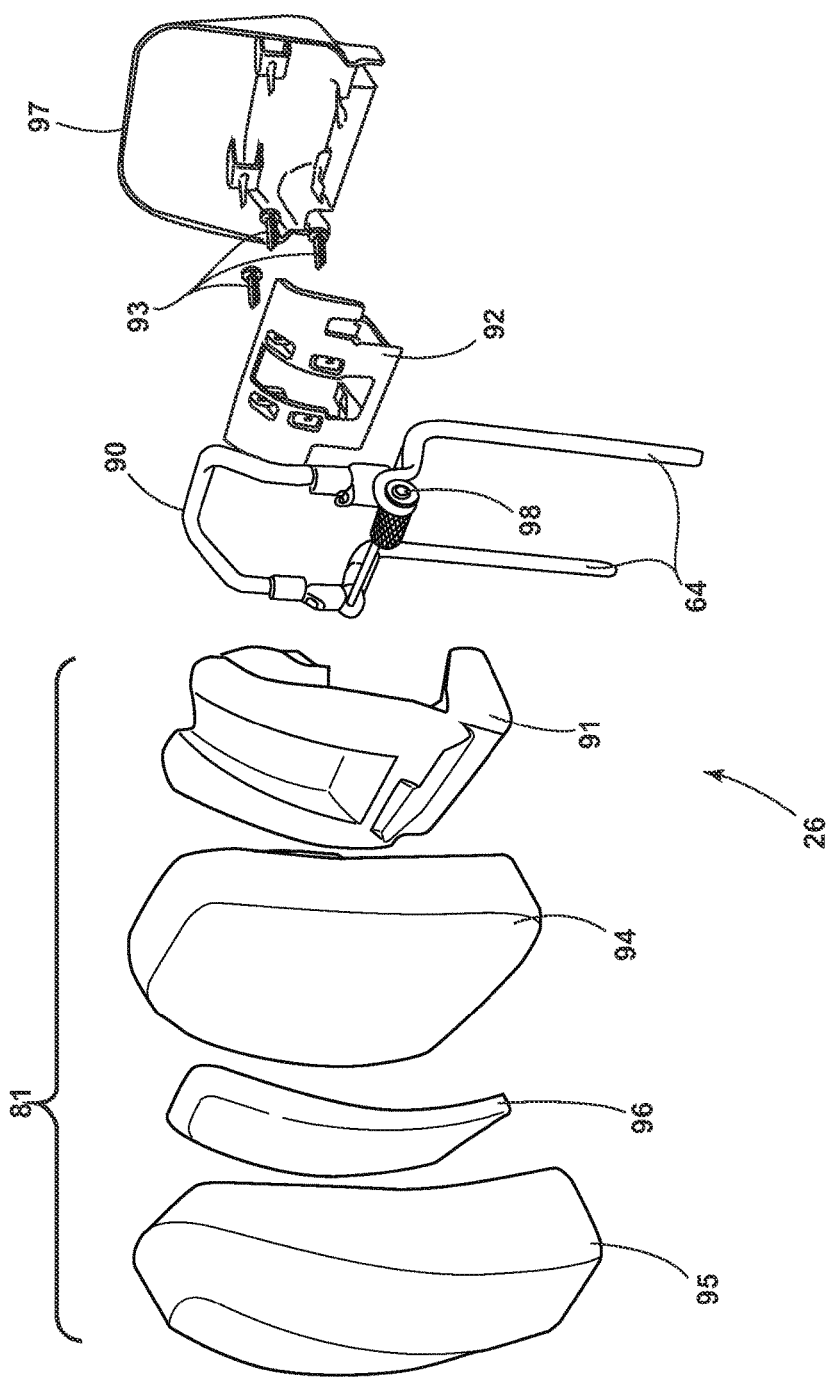
FIG. 4A is a front perspective exploded view of the headrest module of FIG. 4.

Referring now to the illustrated headrest module 26 of FIGS. 4 and 4A, the headrest module 26 includes a frame 90 operably coupled with the engagement posts 64. The frame 90 supports a forward structural member 91 and a rearward structural member 92. The forward structural member 91 and the rearward structural member 92 are connected via mechanical fasteners 93 that extend through the frame 90 of the headrest module 26. The forward structural member 91 supports a headrest cushion 94. A coverstock 95 and a spacer fabric 96 are disposed over the headrest cushion 94 and are in secure engagement with the forward structural member 91 of the headrest module 26. A rear side of the rearward structural member 92 includes a headrest back panel 97 that conceals the structural components of the headrest module 26 from view from passengers sitting behind the vehicle seating assembly 10. The frame 90 of the headrest module 26 includes a latching mechanism 98 to accommodate rotational movement of the frame 90 relative to the engagement posts 64. Accordingly, the relative angle of the frame 90, and consequently the headrest cushion 94, can be adjusted to a desired position to accommodate passengers of different heights and sizes.

Figure 5:
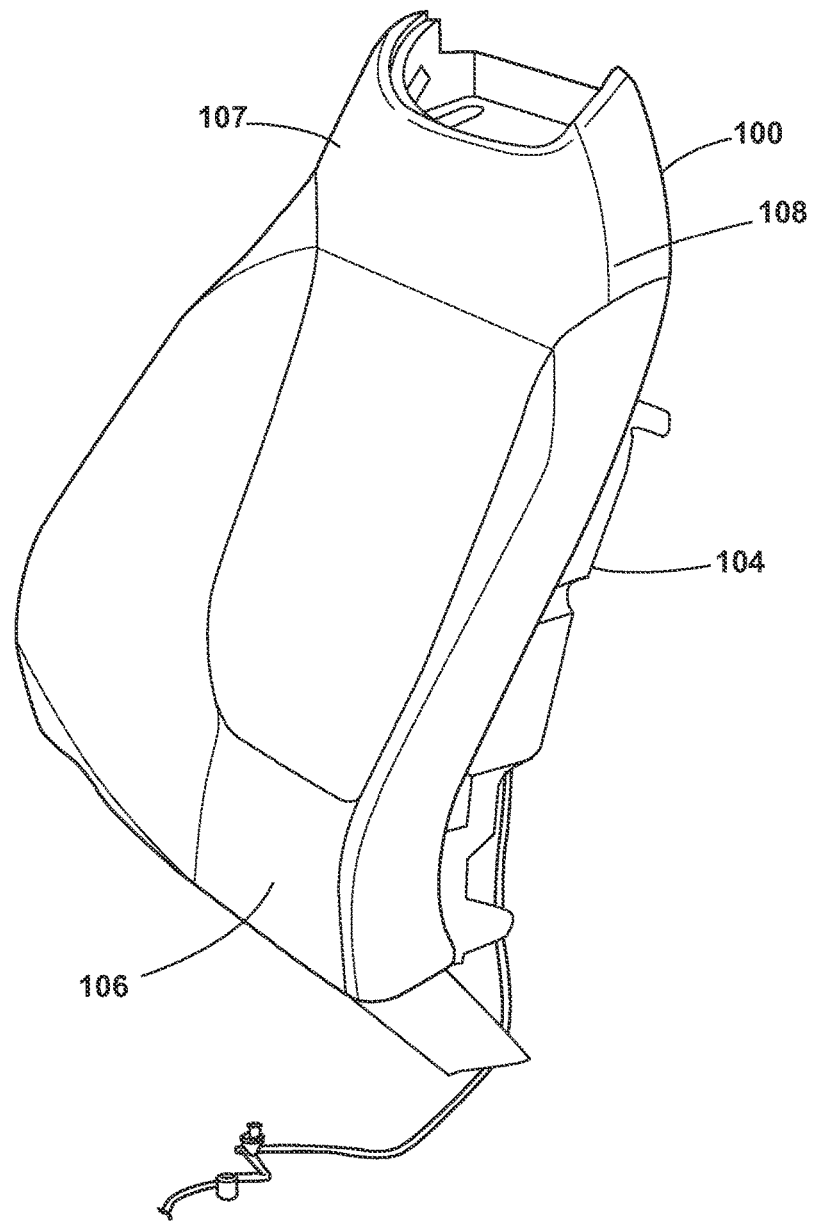
FIG. 5 is a front perspective view of the back cushion module.
Figure 6:
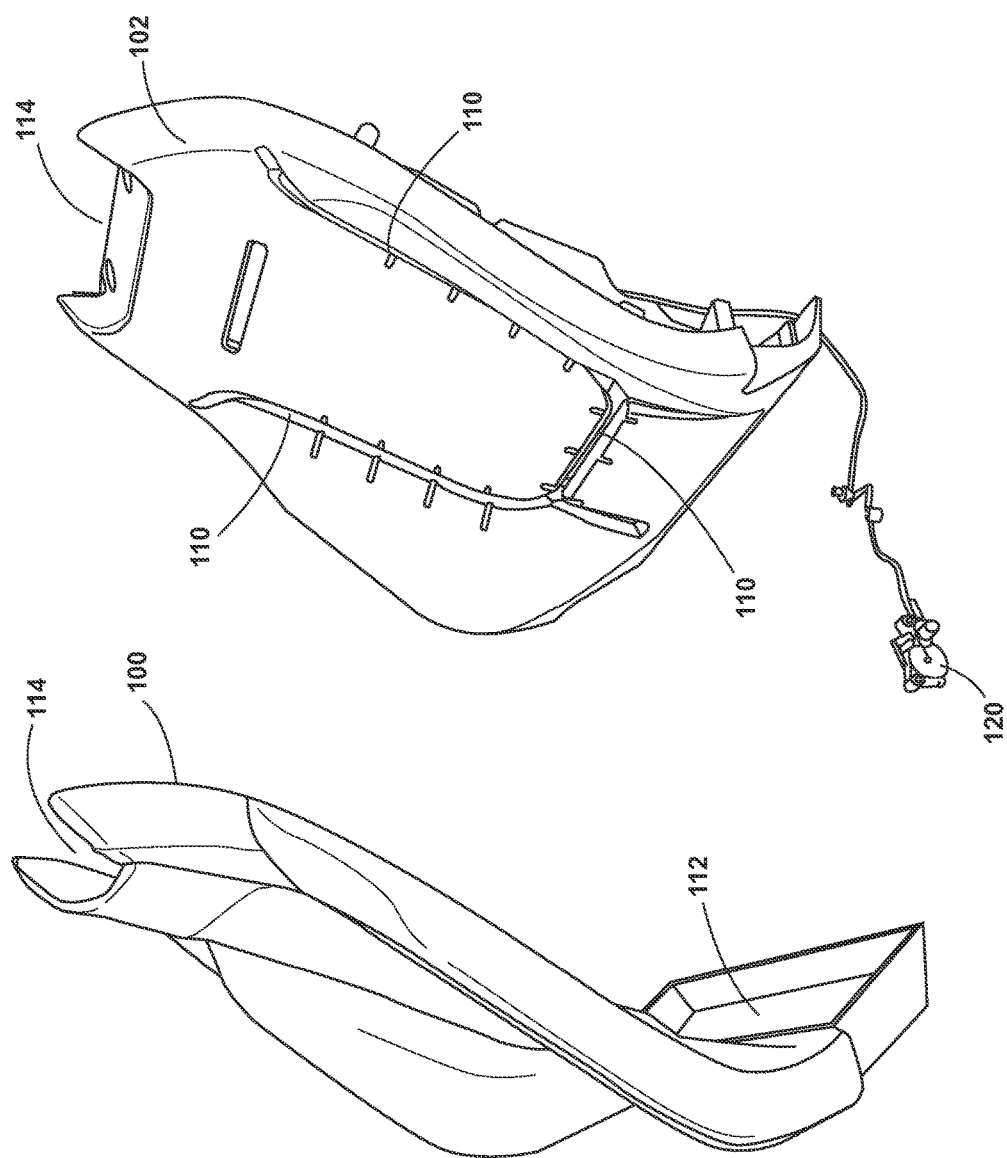
FIG. 6 is a front perspective view of a coverstock removed from a cushion portion of the back cushion module.
Figure 7:
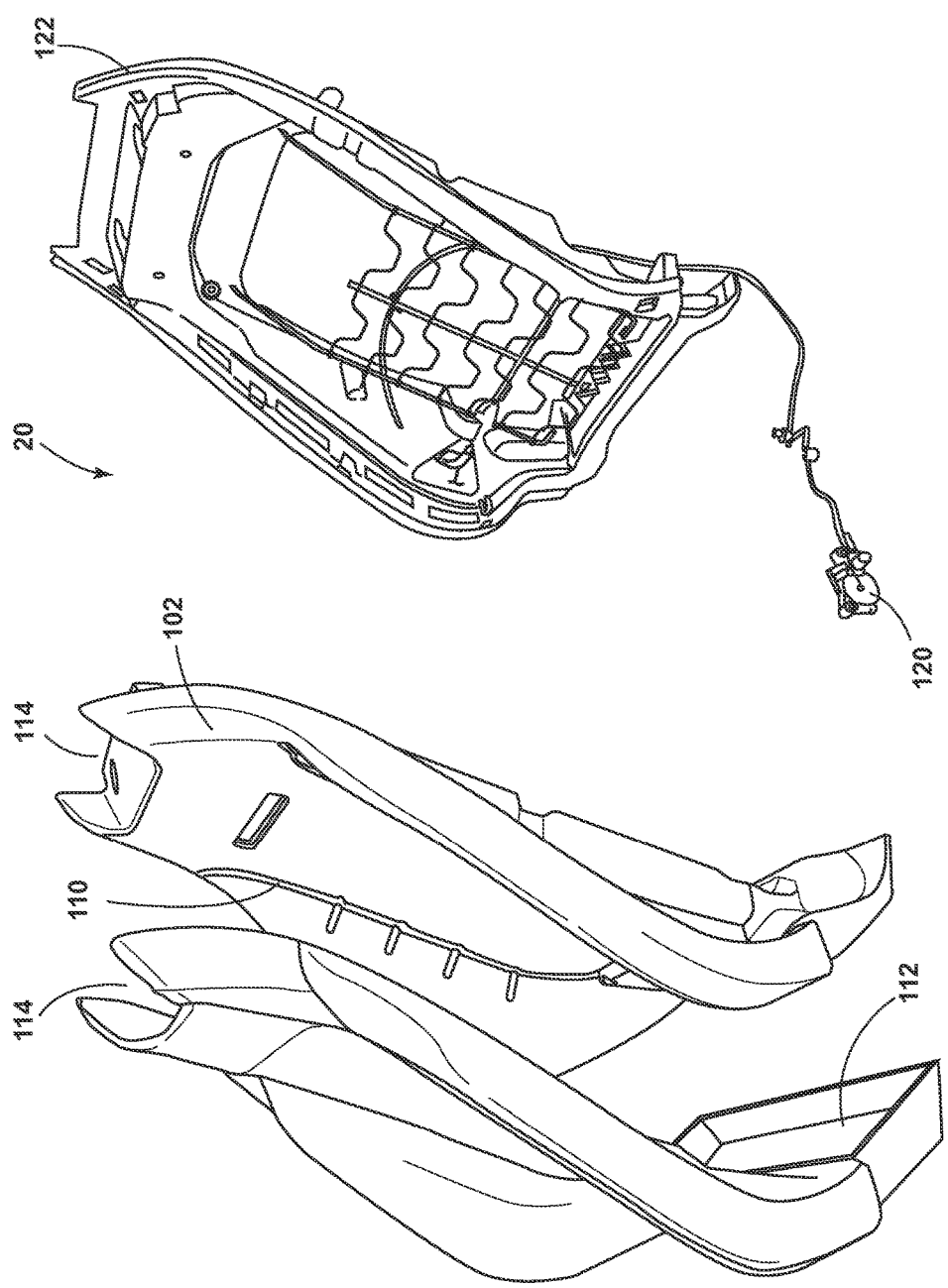
FIG. 7 is a front perspective partially exploded view of the back cushion module of FIG. 5.

With reference to FIGS. 5-7, the back cushion module 20 includes a seatback coverstock 100 that extends over a back cushion 102 of the back cushion module 20. In addition, different varieties of the seatback coverstock 100 may be used to cover the back cushion 102 of the back cushion module 20. In the illustrated embodiment, a first coverstock material 104 is used to cover the bolsters 70 and a lower back 106 of the back cushion module 20. A second coverstock material 107 covers a central and upper back 108.

Mechanical fasteners, glue, or other forms of attachment may be used to secure the seatback coverstock 100 with the back cushion module 20.

With reference now to the embodiment generally illustrated in FIG. 6, the back cushion 102 of the back cushion module 20 includes integrally formed trenches 110 configured to receive fasteners disposed on a back surface 112 of the seatback coverstock 100. In addition, an upper portion of both the seatback coverstock 100 and the back cushion 102 includes a recess 114 configured to accommodate the headrest tray 83 and the headrest module 26. Further, a lumbar adjustment assembly 120 (FIG. 7) in the back cushion module 20 is also installed and configured to be adjusted by the lumbar support control 48 disposed on the seat base 38 (FIGS. 1 and 2).

With reference to FIG. 7, the back cushion module 20 includes a back carrier 122 configured to support the lumbar adjustment assembly 120 and also to receive the back cushion 102 and the seatback coverstock 100. It is generally contemplated that the back carrier 122 is constructed from a polymeric material. However, the back carrier 122 could also be constructed from a variety of other materials, including metals or composites.

With reference to FIGS. 8-11, the back carrier 122 is illustrated in more detail. The back carrier 122 includes a plurality of frame attachment features 124 in the form of side tabs 126 and a lower cross member support 127. The side tabs 126 actively engage the inboard side support 73 and the outboard side support 76 of the seatback frame 14 securing the same to the seatback frame 14. The back carrier 122 includes two upper apertures 128 configured to receive engagement posts 64 of the headrest 81. In addition, the back carrier 122 includes an inner flange 144 that provides additional rigidity to the back carrier 122. Fastener apertures 132 are disposed about a periphery of the back carrier 122 and are configured to receive fasteners on one or both of the seatback frame 14 and the back cushion 102. The back carrier 122 generally includes side members 134 that are coupled by a top member 136 and a bottom member 138. The bottom member 138 includes an arcuate support in the form of the lower cross member support 127 that opens rearward, and which wraps about the torsion bar 58 (FIG. 2) of the vehicle seating assembly 10. A support flange 145 extends upward from the arcuate support and includes flange reinforcements 146 extending across the support flange 145.

With reference to FIGS. 10 and 11, the frame attachment features 124 are designed to fit into the inboard side support 73 and the outboard side support 76 to maintain the back carrier 122 in position on the seatback frame 14. At the same time, the top member 136 of the back carrier 122 is aligned with adjacent to the top cross member 78 of the seatback frame 14. Accordingly, the back carrier 122 closely receives the seatback frame 14 such that minimal space is disposed between the back carrier 122 and the seatback frame 14.

Figure 12:
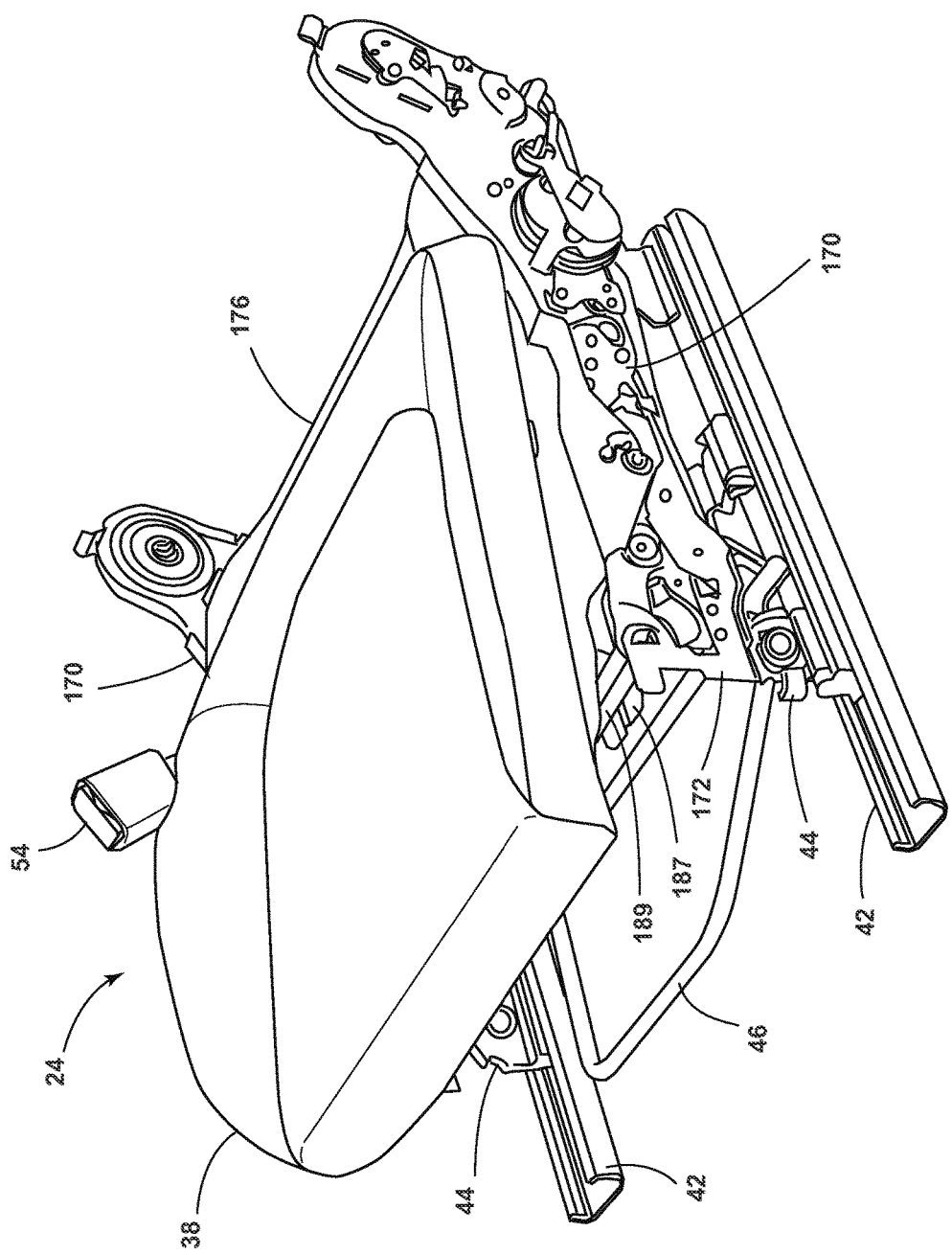
FIG. 12 is a top perspective view of a seat cushion module of the present disclosure.
Figure 13:
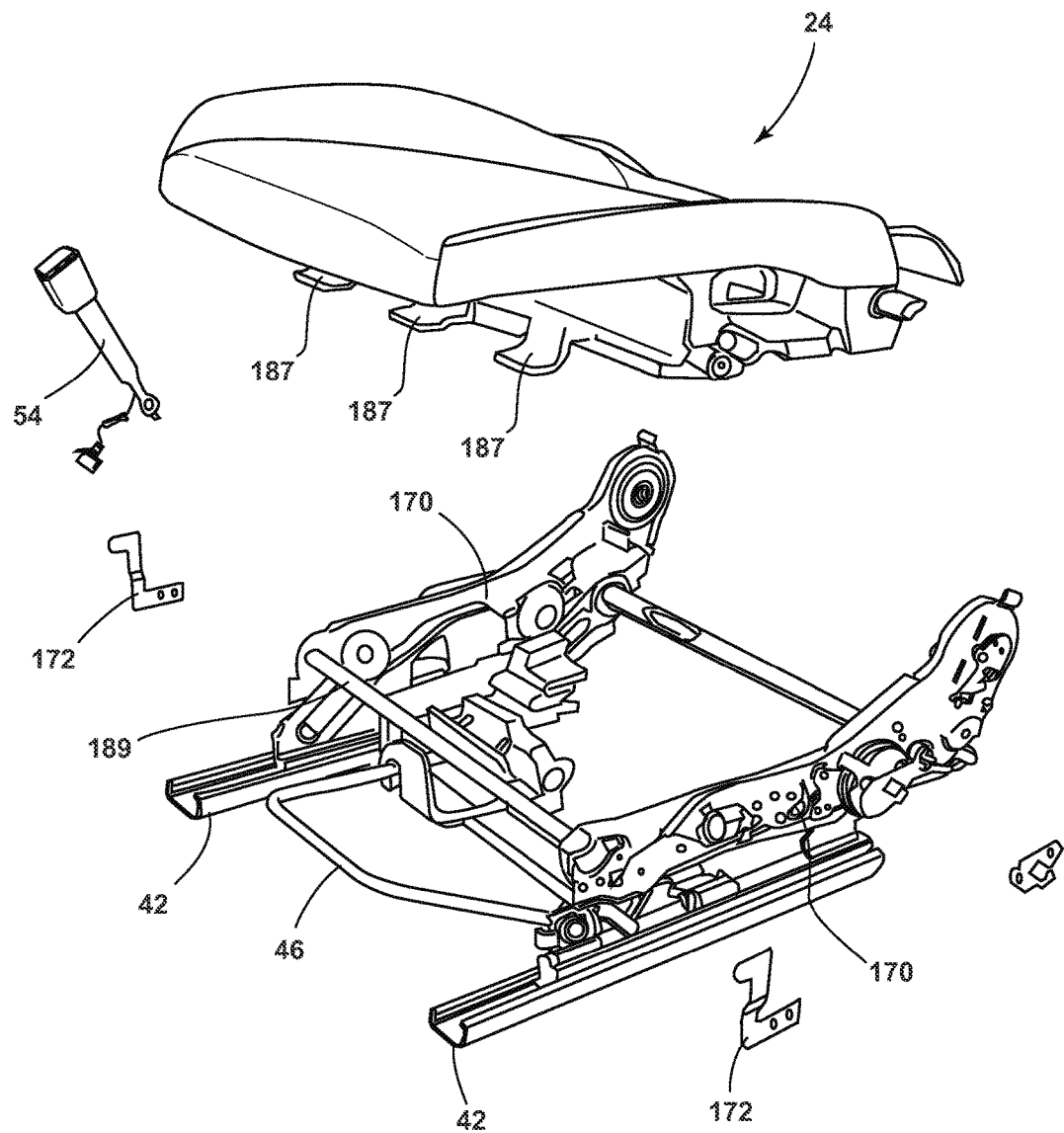
FIG. 13 is a top perspective partially exploded view of the seat cushion module of FIG. 12.
Figure 14:
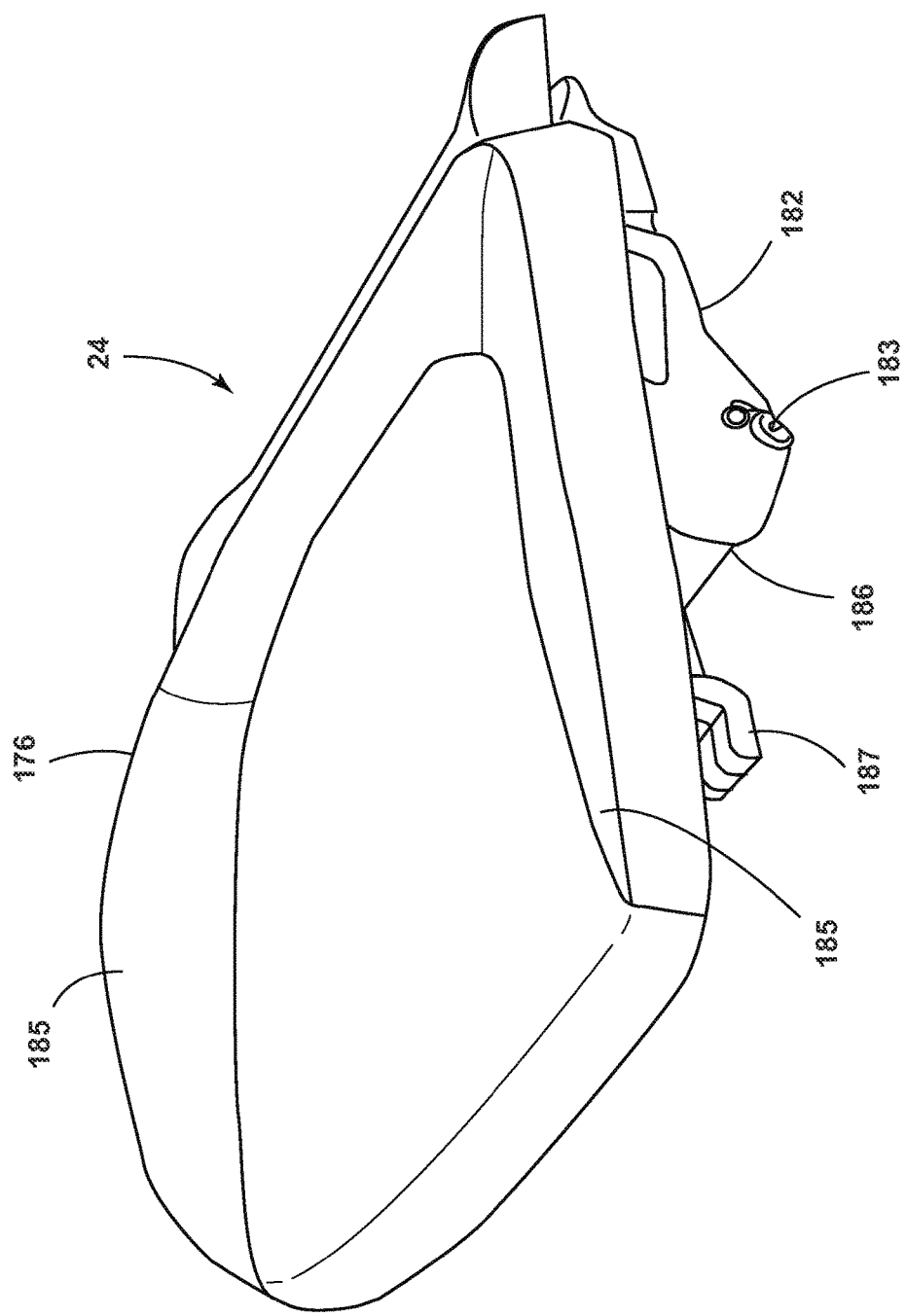
FIG. 14 is a top perspective view of the seat cushion module with the underlying support frame removed.
Figure 15:
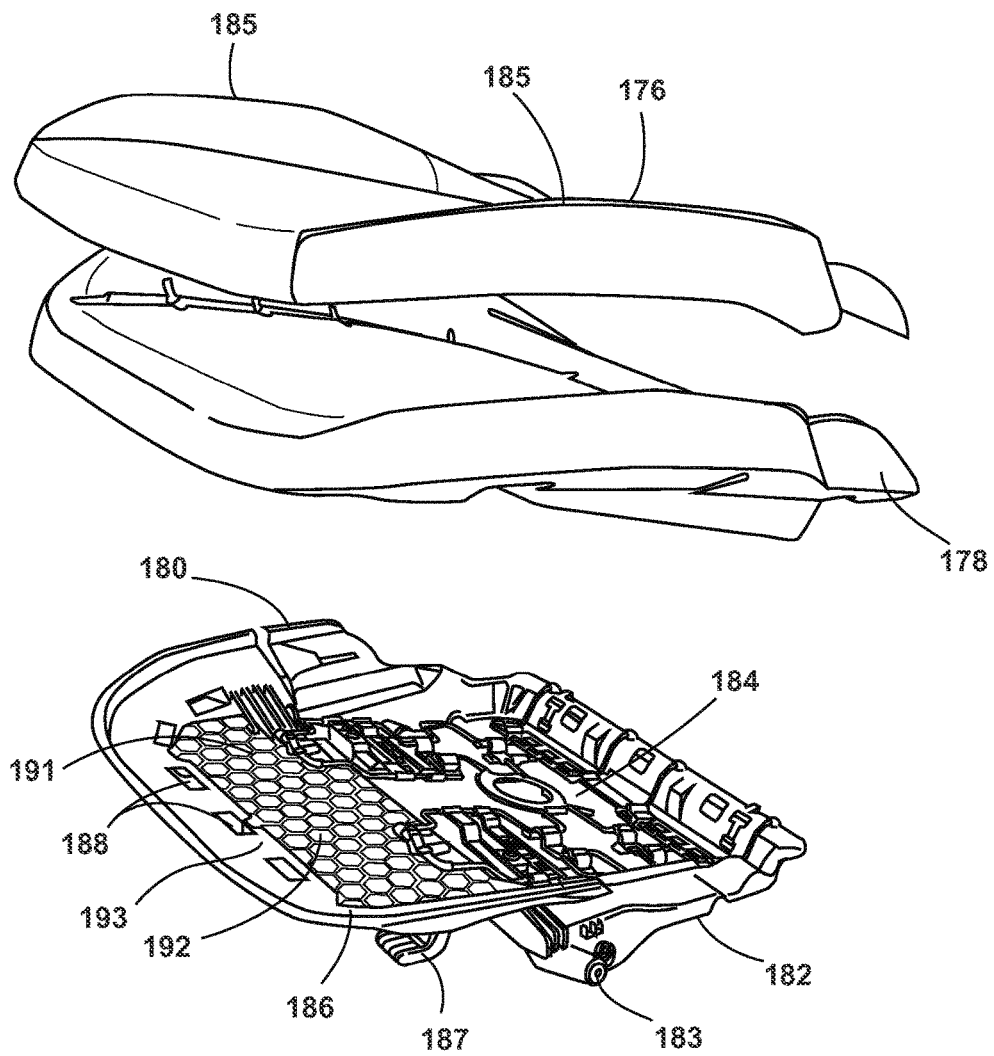
FIG. 15 is a top perspective partially exploded view of the seat cushion module of FIG. 14.
Figure 16:
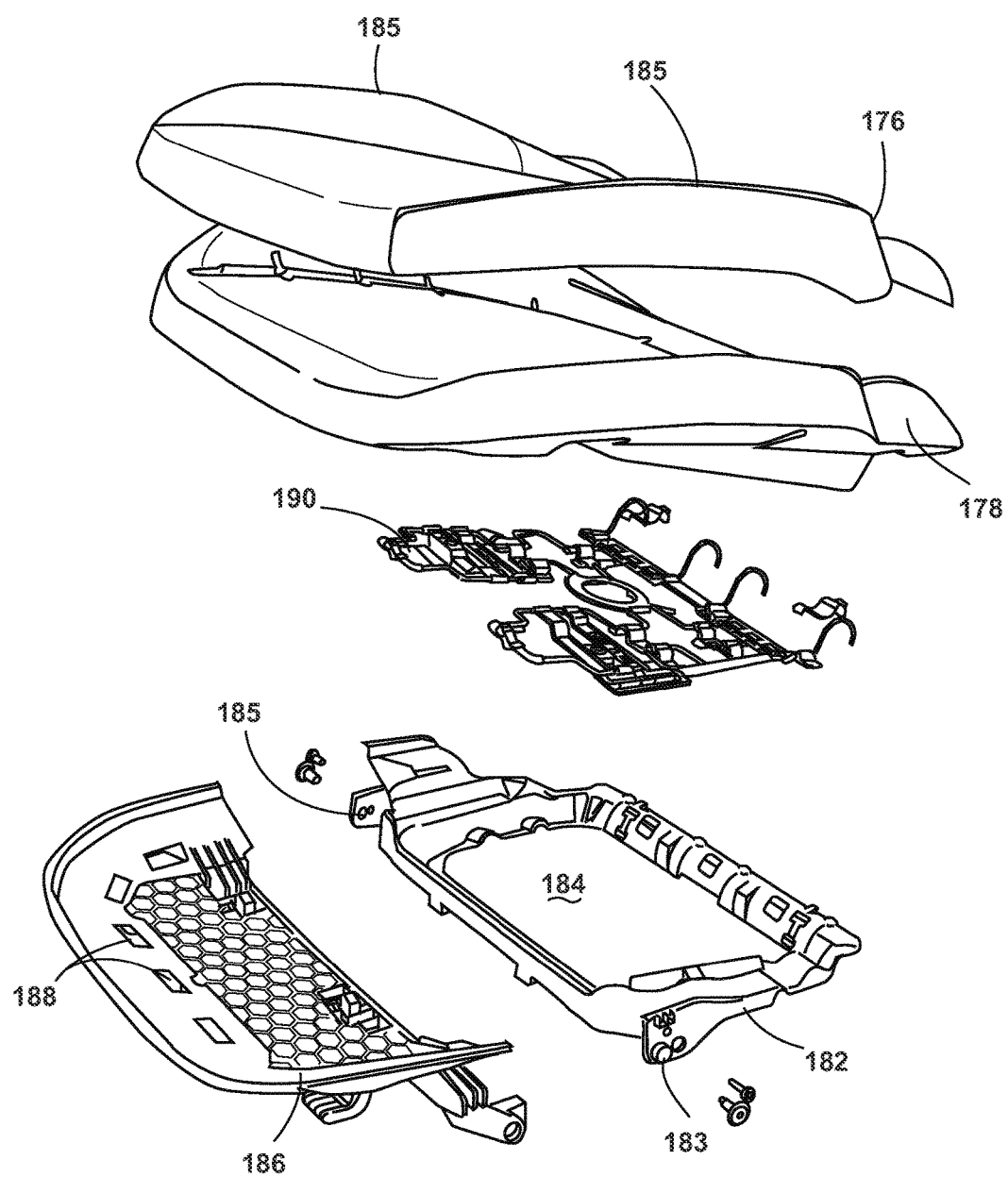
FIG. 16 is another top perspective partially exploded view of the seat cushion module of FIG. 14.

With reference now to FIGS. 12 and 13, the illustrated seat base 38 includes the slides 44 of the seat cushion module 24 supported on the rails 42. Seat side supports 170 support the seat cushion module 24 above the rails 42 and the slides 44. As shown in FIG. 13, the seat cushion module 24 is supported on the seat side supports 170 by connecting brackets 172. In addition, the seatbelt fastener receiver 54 is also disposed adjacent to the seat cushion module 24 and operably coupled with the vehicle.

With reference to FIGS. 13-16, the seat cushion module 24 includes a seat coverstock 176 that extends over a seat cushion 178. Similar to the back cushion module 20, the seat coverstock 176 may include different varieties over different portions of the seat cushion 178. The seat coverstock 176 and the seat cushion 178 are operably coupled with a composite cushion pan 180. The composite cushion pan 180 includes a rearward support 182 defining an intermediate open area 184 and a forward support 186 pivotally coupled to the rearward support 182 at pivot joints 183. The forward support 186 is pivotally coupled to the rearward support 182 to provide adjustability and increased or decreased support to the thighs of a passenger. Side thigh supports 185 also provide thigh support to passengers. The forward support 186 includes arranging upwardly extending flanges 191 in a honeycomb structure 192 across a lower wall 193 of the forward support 186.

With reference again to FIGS. 13-16, the forward support 186 includes hooked tabs 187 that extend below the forward support 186 and forward. The hooked tabs 187 engage an adjustable cross bar 189 that can be raised or lowered to accommodate the legs of different sized passengers. The forward support 186 may be adjusted manually or by a motorized assembly. The forward support 186 is pivotally adjustable up and down relative to the rearward support 182. The forward support 186 includes a plurality of apertures 188 configured to receive mechanical fasteners that wrap the seat coverstock 176 about a forward portion of the seat cushion module 24. In addition, a suspension assembly 190 is disposed in the intermediate open area 184 of the rearward support 182. The suspension assembly 190 supports the seat cushion 178 and the seat coverstock 176, and is configured to withstand both the static and dynamic loads associated with a seated passenger during travel.

Referring again to FIGS. 13-16, the vehicle seating assembly 10 disclosed herein is constructed from the various modules set forth in detail above. It will be understood that the back cushion module 20, the hard back module 22, the seat cushion module 24, and the headrest module 26 are all integrally formed as separate and distinct modules at remote sites. Subsequently, after construction, each of the modules is sent to a manufacturing facility where the modules are installed over the seating frame 12. This construction allows for quick and easy manufacturing and independence of each of the modules. That is, that modules can be swapped in and out of the vehicle seating assembly 10 without having to deconstruct the entire vehicle seating assembly 10. This provides minimized production time, increased savings of production, and an overall better product. Further, additions or changes can be made to separate modules without impacting other modules on the vehicle seating assembly 10.

Vehicle seating assemblies are traditionally assembled piece by piece from the floor up. Complexities of the seating assemblies can be achieved using this technique, but the process is time consuming and costly. In addition, lack of modularity results in costly and time intensive repairs and replacement. A modular system, such as that set forth above provides an ideal way to construct multiple modules at different locations or facilities at different geographic locations, and bring them to a single site for to complete the final vehicle seating assembly. In addition, this system provides an easy method for building a seating assembly. Specifically, only a few parts (each of the modules) are brought together and secured with the seating frame. Accordingly, few fasteners and tools to tighten those fasteners are needed. Moreover, repair or replacement of parts is simplified. If, for example, the seat cushion assembly has a defect or has been damaged, the seat cushion assembly can be removed from the vehicle seating assembly and replaced in just a few minutes.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
    a seating frame defined by a seatback frame and a seat frame;
    a plurality of distinct assembly modules configured for attachment with the seating frame, the plurality of distinct assembly modules including:
        a back cushion module;
        a hard back module;
        a seat cushion module; and
        a headrest module including a headrest slidably coupled with a concave headrest tray, the headrest tray further including downwardly-extending supports that engage the seatback frame and the back cushion module;
    wherein the back cushion module and hard back module are operably coupled together, and wherein the headrest module extends over and operably couples the back cushion module with the hard back module to substantially encompass the seatback frame, and further wherein the hard back module is positioned on the seat frame behind the seatback frame; and
    first and second side trim pieces configured to extend over the seat frame concealing side portions of the seat cushion module.

2. The vehicle seating assembly of claim 1, wherein the hard back module is mechanically fastened to the back cushion module.

3. The vehicle seating assembly of claim 1, wherein the headrest tray operably couples the back cushion module, seatback frame, and hard back module.

4. The vehicle seating assembly of claim 3, wherein the headrest tray further includes an upwardly-extending back wall and a downwardly extending front lip.

5. The vehicle seating assembly of claim 1, further comprising:
    a polymeric back carrier that provides structural rigidity to the back cushion module and which abuts the seatback frame and is operably coupled directly with the hard back module.

6. The vehicle seating assembly of claim 5, wherein the polymeric back carrier includes two upper apertures aligned with apertures in the seatback frame and which are configured to receive engagement posts of the headrest module.

7. The vehicle seating assembly of claim 5, wherein the polymeric back carrier includes a lower member having an arcuate support that opens rearwardly.

8. A vehicle seating assembly comprising:
    a seatback frame encompassed by a plurality of distinct assembly modules including:
        a back cushion module;
        a hard back module;
        a seat cushion module; and
        a headrest module including a headrest tray, the headrest tray further including downwardly-extending supports that engage the seatback frame and the back cushion module;
    the back cushion module and hard back module being operably coupled together, wherein the headrest tray extends over and operably couples the back cushion module with the hard back module to substantially encompass the seatback frame.

9. The vehicle seating assembly of claim 8, wherein the hard back module includes a lower lip that extends below the back cushion module and which partially wraps around a portion of the seat cushion module.

10. The vehicle seating assembly of claim 8, wherein the hard back module is mechanically fastened to the back cushion module.

11. The vehicle seating assembly of claim 8, wherein the headrest tray operably couples the back cushion module, seatback frame, and hard back module.

12. The vehicle seating assembly of claim 11, wherein the headrest tray further includes an upwardly-extending back wall and a downwardly extending front lip.

13. The vehicle seating assembly of claim 8, further comprising:
a polymeric back carrier that provides structural rigidity to the back cushion module and which abuts the seatback frame and is operably coupled directly with the hard back module.

14. The vehicle seating assembly of claim 13, wherein the polymeric back carrier includes two upper apertures aligned with apertures in the seatback frame and which are configured to receive engagement posts of the headrest module.

15. A method of making a vehicle seating assembly comprising:
constructing a seating assembly frame having a seatback frame;
providing a plurality of distinct assembly modules including:
a back cushion module;
a hard back module; and
a headrest tray with downwardly-extending supports that engage the seatback frame and the back cushion module; and
coupling the headrest tray with a top of the back cushion module and the hard back module to conceal the seatback frame.

16. The method of claim 15, further comprising:
positioning the headrest tray over the back cushion module, seatback frame, and hard back module which operably couples the back cushion module, seatback frame, and hard back module.

17. The method of claim 16, further comprising:
forming the headrest tray to include an upwardly-extending back wall and a downwardly extending front lip.

18. The method of claim 17, wherein the hard back module is mechanically fastened to the back cushion module.

19. The method of claim 15, further comprising:
coupling a polymeric back carrier with the back cushion module; and
coupling the back carrier directly with the hard back module.

20. The method of claim 15, further comprising:
forming two upper apertures in the polymeric back carrier which are aligned with apertures in the seatback frame and which are configured to receive engagement posts of the headrest module.

* * * * *